(12) United States Patent
Wada et al.

(10) Patent No.: US 11,707,968 B2
(45) Date of Patent: Jul. 25, 2023

(54) THERMAL REQUEST MEDIATING DEVICE

(71) Applicant: TOYOTA JIDOSHA KABUSHIKI KAISHA, Toyota (JP)

(72) Inventors: Ryuichi Wada, Nagoya (JP); Tatsuya Masuhisa, Anjyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 36 days.

(21) Appl. No.: 17/446,365

(22) Filed: Aug. 30, 2021

(65) Prior Publication Data

US 2021/0387504 A1    Dec. 16, 2021

Related U.S. Application Data

(63) Continuation of application No. 16/808,465, filed on Mar. 4, 2020, now Pat. No. 11,135,900.

(30) Foreign Application Priority Data

Mar. 20, 2019    (JP) ................ 2019-053636

(51) Int. Cl.
*B60H 1/00* (2006.01)
*B60H 1/32* (2006.01)

(52) U.S. Cl.
CPC ..... *B60H 1/00885* (2013.01); *B60H 1/00735* (2013.01); *B60H 1/32284* (2019.05); *B60H 2001/00928* (2013.01); *B60H 2001/00942* (2013.01); *B60H 2001/00949* (2013.01)

(58) Field of Classification Search
CPC ............ B60H 1/00885; B60H 1/32284; B60H 1/00735; B60H 2001/00928; B60H 2001/00942; B60H 2001/00949
See application file for complete search history.

(56) References Cited

U.S. PATENT DOCUMENTS

| 6,112,543 | A | 9/2000 | Feuerecker |
| 11,135,900 | B2* | 10/2021 | Wada .................. B60H 1/3211 |
| 2015/0095313 | A1 | 4/2015 | Hiraguchi |
| 2017/0021698 | A1 | 1/2017 | Hatakeyama et al. |
| 2017/0297414 | A1 | 10/2017 | Beloe |
| 2017/0368911 | A1* | 12/2017 | Okamoto ............. B60W 10/06 |
| 2019/0366800 | A1 | 12/2019 | Durrani |

(Continued)

FOREIGN PATENT DOCUMENTS

| JP | 2012-250639 A | 12/2012 |
| JP | 2015-186989 A | 10/2015 |

OTHER PUBLICATIONS

Open EI web page, Definition: Heat, Jul. 24, 2012. (Year: 2012).*

*Primary Examiner* — Marc E Norman
(74) *Attorney, Agent, or Firm* — Oblon, McClelland, Maier & Neustadt, L.L.P.

(57) ABSTRACT

A thermal request mediating device includes a calculation unit configured to calculate amounts of heat for thermal circuits, a mediation unit configured to determine amounts of absorbed heat or amounts of discharged heat which are allocated to the thermal circuits based on amounts of heat transferable between the thermal circuits, and a distribution unit configured to distribute amounts of absorbed heat or amounts of discharged heat to units which are included in each thermal circuit based on the determined amounts of absorbed heat or amounts of discharged heat.

16 Claims, 14 Drawing Sheets

(56) References Cited

U.S. PATENT DOCUMENTS

| | | | |
|---|---|---|---|
| 2020/0164719 A1 | 5/2020 | Shiratori | |
| 2020/0298657 A1* | 9/2020 | Allgaeuer | B60H 1/22 |
| 2020/0324611 A1 | 10/2020 | Yano | |
| 2021/0300144 A1* | 9/2021 | Kawabe | B60H 1/0073 |
| 2021/0394580 A1* | 12/2021 | Chopard | B60L 53/10 |
| 2022/0161629 A1* | 5/2022 | Wada | B60H 1/3208 |
| 2022/0176771 A1* | 6/2022 | Wada | B60H 1/32284 |

\* cited by examiner

THERMAL REQUEST MEDIATING DEVICE

INCORPORATION BY REFERENCE

This application is a continuation of U.S. application Ser. No. 16/808,465, filed Mar. 4, 2020, which claims priority to Japanese Patent Application No. 2019-053636 filed on Mar. 20, 2019, the entire contents of which are incorporated herein by reference in their entirety.

BACKGROUND

1. Technical Field

The disclosure relates to a thermal request mediating device.

2. Description of Related Art

Japanese Patent Publication No. 2015-186989 (JP 2015-186989 A) discloses a vehicular air conditioner that includes a refrigeration circuit, a low coolant-temperature circuit, and a high coolant-temperature circuit, enables the refrigeration circuit and the high coolant-temperature circuit to exchange heat via a condenser, and enables the refrigeration circuit and the low coolant-temperature circuit to exchange heat via a refrigerant-coolant heat exchanger. In the vehicular air conditioner described in JP 2015-186989 A, improvement in efficiency of the refrigeration circuit can be achieved by providing a subcooling (SC) condenser that can exchange heat between the refrigeration circuit and the low coolant-temperature circuit and promoting cooling of a refrigerant of the refrigeration circuit using the SC condenser.

SUMMARY

In a system in which heat can be transferred between a plurality of thermal circuits as described in JP 2015-186989 A, there are many combinations of heat absorption/discharge requests from units which are included in thermal circuits and mediation of the heat absorption/discharge requests is complicated. Accordingly, there is room for improvement in a structure for mediating thermal requests from a plurality of units.

Therefore, the disclosure provides a thermal request mediating device that can efficiently mediate thermal requests from a plurality of units in a vehicle including the plurality of units performing absorption or discharge of heat.

A thermal request mediating device according to an aspect of the disclosure is mounted in a vehicle including a first thermal circuit configured to circulate a high-temperature coolant, a second thermal circuit configured to circulate a low-temperature coolant, a third thermal circuit configured to circulate a refrigerant while changing a state of the refrigerant and to exchange heat with the first thermal circuit and the second thermal circuit, and a plurality of units configured to perform absorption or discharge of heat via any one of heat mediums which circulate in the first thermal circuit, the second thermal circuit, and the third thermal circuit. The thermal request mediating device comprising: an acquisition unit configured to acquire amounts of heat which are requested by the plurality of units, the amounts of heat being amounts of absorbed heat or amounts of discharged heat; a calculation unit configured to calculate amounts of heat which are requested by the first thermal circuit, the second thermal circuit, and the third thermal circuit based on the amounts of heat which are requested by the plurality of units and which are acquired by the acquisition unit; a mediation unit configured to determine amounts of heat which are allocated to the first thermal circuit, the second thermal circuit, and the third thermal circuit based on the amounts of heat which are requested by the first thermal circuit, the second thermal circuit, and the third thermal circuit, an amount of heat transferable from the second thermal circuit to the third thermal circuit, and an amount of heat transferable from the third thermal circuit to the first thermal circuit; and a distribution unit configured to distribute amounts of heat to the units which are included in the first thermal circuit, the second thermal circuit, and the third thermal circuit based on the amounts of heat determined by the mediation unit.

According to the disclosure, it is possible to provide a thermal request mediating device that can efficiently mediate thermal requests from a plurality of units in a vehicle including the plurality of units performing absorption or discharge of heat.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A thermal request mediating device according to an embodiment of the disclosure collects amounts of absorbed heat or amounts of discharged heat which are requested by thermal circuits, calculates amounts of absorbed heat or amounts of discharged heat which are allocated to the thermal circuits based on an amount of heat transferable among the thermal circuits, and distributes amounts of absorbed heat or amounts of discharged heat to units which are included in each thermal circuit based on the calculated amounts of absorbed heat or amounts of discharged heat. By separately performing mediation of thermal requests between thermal circuits and mediation of thermal requests in each thermal circuit, it is possible to efficiently perform mediation of thermal requests from a plurality of units and to reduce an influence of a change in configuration of units of each thermal circuit.

Embodiment

Configuration

Figure 1:
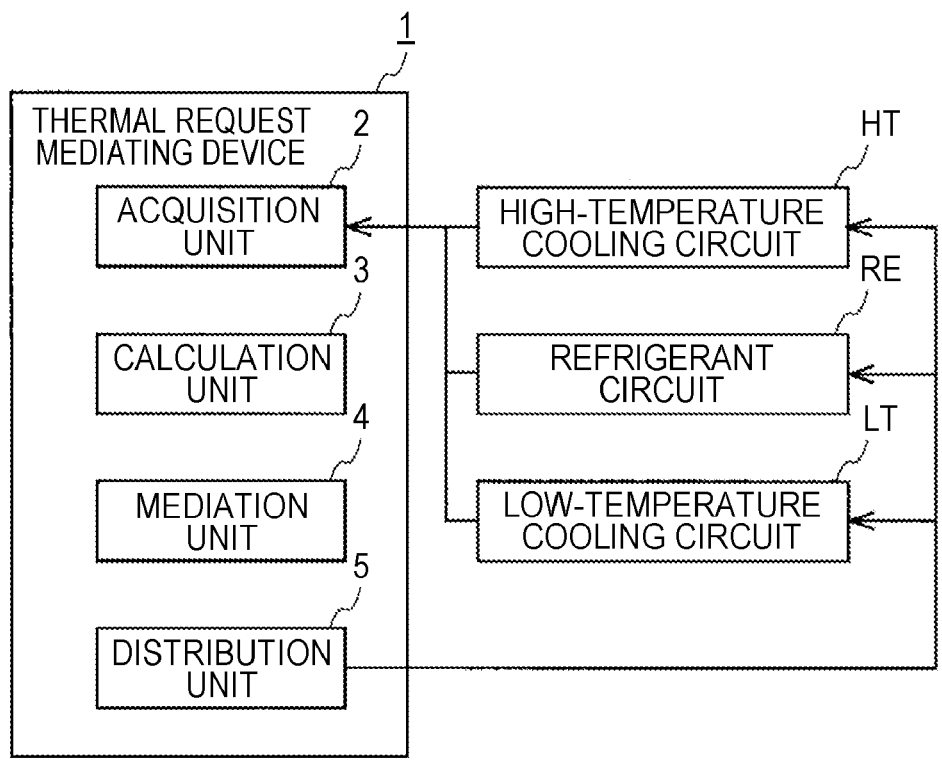
FIG. 1 is a functional block diagram schematically illustrating configurations of a thermal request mediating device and thermal circuits according to an embodiment.

FIG. 1 is a functional block diagram schematically illustrating configurations of a thermal request mediating device and thermal circuits according to an embodiment.

A thermal request mediating device 1 is a device that is mounted in a vehicle including three thermal circuits such as a high-temperature cooling circuit HT, a low-temperature cooling circuit LT, and a refrigerant circuit RE and mediates thermal requests from a plurality of units included in the thermal circuits. The thermal request mediating device 1 can communicate with controllers of the units included in the thermal circuits via an onboard network. The high-temperature cooling circuit HT, the low-temperature cooling circuit LT, and the refrigerant circuit RE each include a flow passage in which a heat medium circulates. The units included in each thermal circuit can exchange heat with the heat medium. The refrigerant circuit RE is coupled to the high-temperature cooling circuit HT and the low-temperature cooling circuit LT such that heat exchange therewith is possible. Here, a thermal request from each unit is information including a value of an amount of absorbed heat or an amount of discharged heat which is requested by the unit. In this embodiment, an amount of absorbed heat or an amount of discharged heat is expressed by an amount of thermal energy transferred per unit time (a work ratio with a unit of W). In the following description, for the purpose of convenience of explanation, an amount of absorbed heat or an amount of discharged heat which is requested by a unit is referred to as an "amount of heat requested by a unit" and an amount of absorbed heat or an amount of discharged heat which is requested by a thermal circuit is referred to as an "amount of heat requested by a thermal circuit."

The thermal request mediating device 1 includes an acquisition unit 2, a calculation unit 3, a mediation unit 4, and a distribution unit 5. The acquisition unit 2 acquires amounts of heat requested by controllers of a plurality of units included in each thermal circuit by communication. The calculation unit 3 collects the amounts of heat requested by the plurality of units acquired by the acquisition unit 2 for each thermal circuit and calculates an amount of heat requested by each thermal circuit. The mediation unit 4 determines an allowable amount of heat allocated to each thermal circuit based on the amount of heat requested by each thermal circuit calculated by the calculation unit 3, an amount of heat transferable between the high-temperature cooling circuit HT and the refrigerant circuit RE, and an amount of heat transferable between the low-temperature cooling circuit LT and the refrigerant circuit RE. The amount of allocated heat is an amount of absorbed heat or an amount of discharged heat which is allocated to each thermal circuit. In this embodiment, the amount of heat transferable between thermal circuits and the amount of heat allocated to each thermal circuit are expressed by an amount of thermal energy transferred per unit time, similarly to the amounts of requested heat. The distribution unit 5 distributes the amounts of heat to the units included in each thermal circuit based on the amount of heat allocated to each thermal circuit determined by the mediation unit 4. Details of the process which is performed by the thermal request mediating device 1 will be described later.

Figure 2:
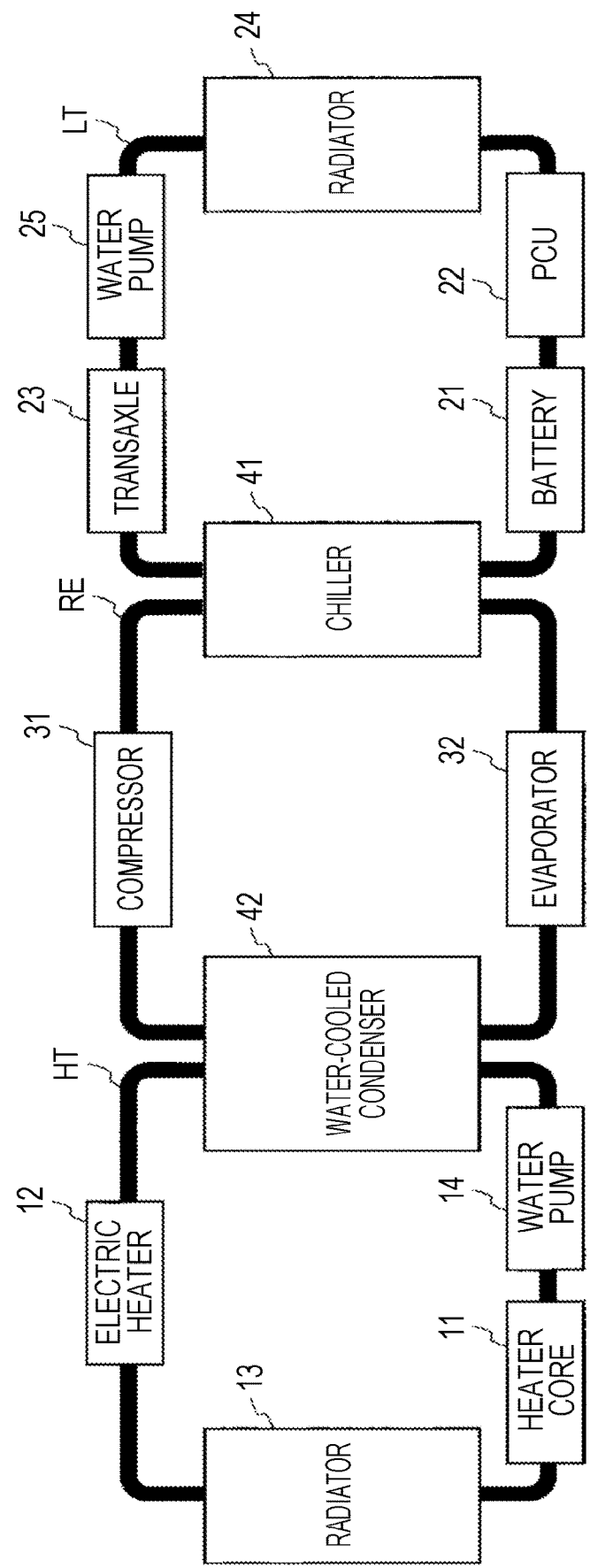
FIG. 2 is a block diagram illustrating an example of configurations of the thermal circuits illustrated in FIG. 1.

FIG. 2 is a block diagram illustrating an example of configurations of the thermal circuits illustrated in FIG. 1. In FIG. 2, flow passages in which a heat medium circulates are illustrated by bold lines.

The high-temperature cooling circuit HT is a circuit that circulates a coolant and includes a heater core 11, an electric heater 12, a radiator 13, and a water pump 14. The high-temperature cooling circuit HT has a function of accumulating heat in a coolant to heat a passenger compartment and a function of discharging heat received from the refrigerant circuit RE by heat exchange to the outside of the vehicle. The heater core 11 is a unit that includes a tube in which a coolant flows and a fin and performs heat exchange between the coolant and air passing through the fin. The electric heater 12 is a unit that heats a coolant when the temperature of the coolant is insufficient. The radiator 13 is a unit that cools a coolant with air, and includes a radiator core that includes a tube in which a coolant flows and a fin and performs heat exchange between air passing through the fin and the coolant, a grille shutter that is provided in front of the radiator core and increases or decreases an amount of air passing through the radiator core, and a radiator fan that is provided behind the radiator core and forcibly blows air to the radiator core. The water pump 14 is a unit that circulates a coolant.

In the high-temperature cooling circuit HT, the heater core 11 and the radiator 13 are units that can absorb heat from a coolant, and the electric heater 12 is a unit that can discharge heat to the coolant. The water pump 14 performs neither absorption nor discharge of heat, but is a unit that can change an amount of heat discharged from the radiator 13 and an amount of heat transferred to the refrigerant circuit RE via a water-cooled condenser 42 which will be described later based on a flow rate of the coolant.

The low-temperature cooling circuit LT is a circuit that circulates a coolant and includes a battery 21, a power control unit (hereinafter referred to as a "PCU") 22, a transaxle (hereinafter referred to as a "TA") 23, a radiator 24, and a water pump 25. The battery 21 is a unit that stores electric power which is supplied to a traveling motor. The PCU 22 is a unit that includes an inverter driving the traveling motor and a DCDC converter converting a voltage and controls electric power which is supplied to the traveling motor. The TA 23 is a unit in which the traveling motor, a power generator, a power split mechanism, and a transmission are incorporated into one body. The radiator 24 is a unit that cools a coolant with air, and includes a radiator core that includes a tube in which a coolant flows and a fin and performs heat exchange between air passing through the fin and the coolant, a grille shutter that is provided in front of the radiator core and increases or decreases an amount of air passing through the radiator core, and a radiator fan that is provided behind the radiator core and forcibly blows air to the radiator core. The water pump 25 is a unit that circulates a coolant.

In the low-temperature cooling circuit LT, the radiator 24 is a unit that can absorb heat from a coolant, and the battery 21, the PCU 22, and the TA 23 are units that can discharge heat to the coolant via a water jacket constituting a part of a flow passage of the coolant. The water pump 25 performs neither absorption nor discharge of heat, but is a unit that can control an amount of heat discharged from the battery 21, the PCU 22, and the TA 23 to the coolant, an amount of heat discharged from the radiator 24, and an amount of heat transferred to the refrigerant circuit RE via a chiller 41 which will be described later based on a flow rate of the coolant. Since the low-temperature cooling circuit LT is provided to cool the battery 21, the PCU 22, and the TA 23 and to secure reliability, the temperature of the coolant circulating in the low-temperature cooling circuit LT is normally kept lower than the temperature of the coolant circulating in the high-temperature cooling circuit HT.

In the following description, for the purpose of distinction between the coolant in the high-temperature cooling circuit HT and the coolant in the low-temperature cooling circuit LT, the former may be referred to as a "high-temperature coolant" and the latter may be referred to as a "low-temperature coolant."

The refrigerant circuit RE is a circuit that circulates a refrigerant while changing the state thereof and includes a compressor 31, an evaporator 32, and a water-cooled condenser 42. In the refrigerant circuit RE, heat can be absorbed from air around the evaporator 32 by condensing the refrigerant compressed by the compressor 31 using the water-cooled condenser 42 and spraying the condensed refrigerant from an expansion valve provided in the evaporator 32 into the evaporator 32 to expand the refrigerant. In the refrigerant circuit RE, the compressor 31 and the evaporator 32 are units that can discharge heat to the refrigerant. The water-cooled condenser 42 is a unit that can absorb heat from the refrigerant and discharge heat to the coolant in the high-temperature cooling circuit HT.

The refrigerant circuit RE is coupled to the low-temperature cooling circuit LT via the chiller 41 such that heat exchange therewith is possible, and can transfer heat generated in the low-temperature cooling circuit LT to the refrigerant circuit RE via the chiller 41. The refrigerant circuit RE is coupled to the high-temperature cooling circuit HT via the water-cooled condenser 42 such that heat exchange therewith is possible, and can transfer heat generated in the refrigerant circuit RE and/or heat transferred from the low-temperature cooling circuit LT to the refrigerant circuit RE to the high-temperature cooling circuit HT via the water-cooled condenser 42.

In FIG. 2, thermal circuits which are mounted in an electric vehicle are exemplified, but the thermal request mediating device according to this embodiment can be applied to a hybrid vehicle. In a hybrid vehicle, the high-temperature cooling circuit HT can be used to cool an engine.

A hierarchical structure of functions of the thermal request mediating device will be described below with reference to FIGS. 3 and 4.

Figure 3:
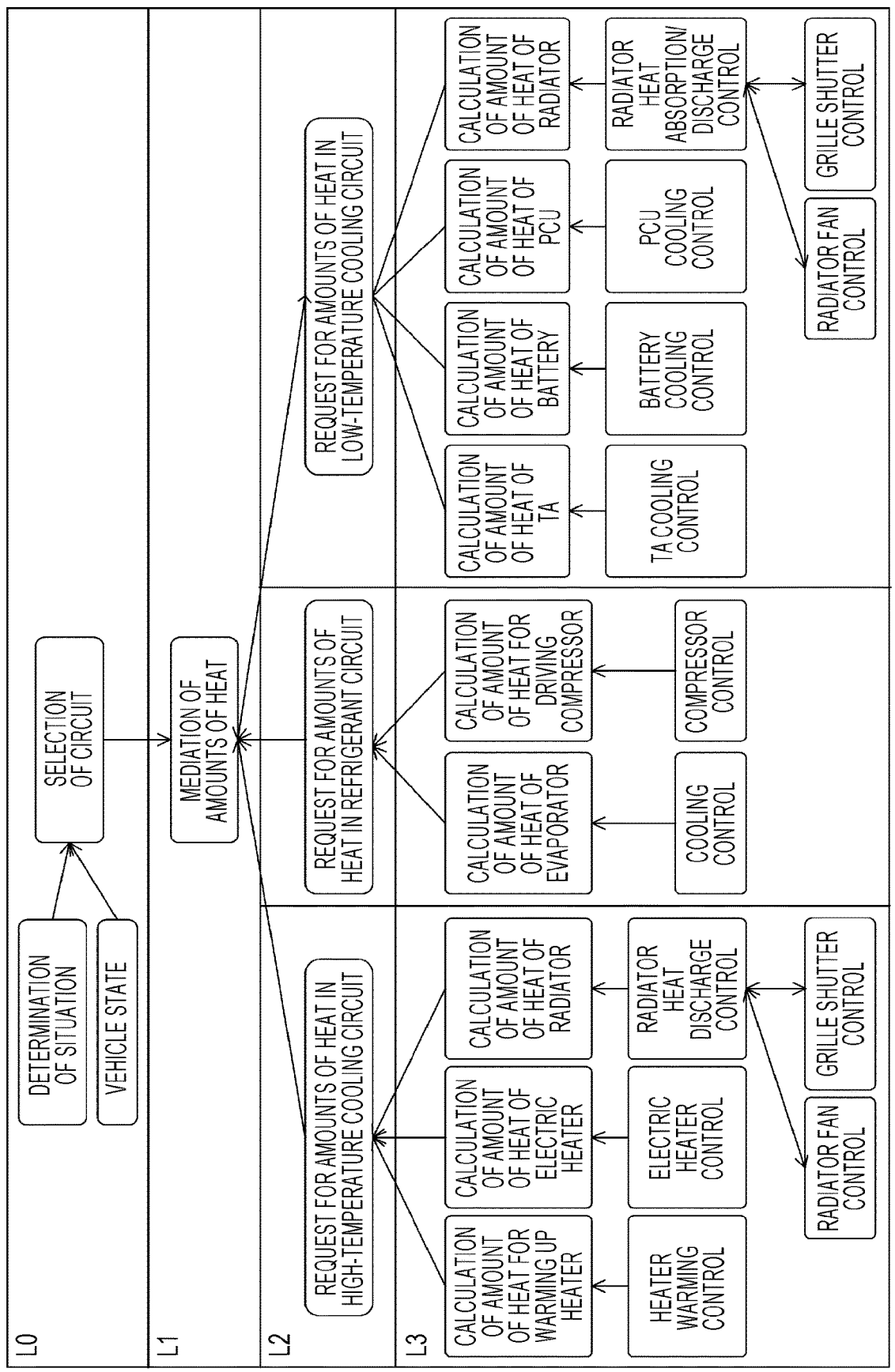
FIG. 3 is a diagram illustrating a hierarchical structure of functions of the thermal request mediating device in a thermal request collection phase.

FIG. 3 is a diagram illustrating a hierarchical structure of functions of the thermal request mediating device in a thermal request collection phase. FIG. 4 is a diagram illustrating a hierarchical structure of functions of the thermal request mediating device in a response phase.

Control of thermal circuits according to this embodiment includes a thermal request collection phase in which thermal requests generated in units of the vehicle are collected and a response phase in which the collected thermal requests are mediated and amounts of absorbed heat or amounts of discharged heat which are distributed based on the result of mediation are returned to the units. Control which is performed in each of the thermal request collection phase and the response phase is layered into three control layers. Processes which are performed in the control layers are as follows.

Layer 1 (L1): The thermal request mediating device 1 mediates amounts of heat requested by three thermal circuits based on the amounts of heat requested by the thermal circuits and amounts of heat transferable between the thermal circuits, and determines amounts of absorbed heat or amounts of discharged heat which are allocated to the thermal circuits and amounts of heat transferred between the thermal circuits. In Layer 1, by mediating the amounts of heat requested by the thermal circuits and the amounts of heat transferred between the thermal circuits, it is possible to effectively use amounts of heat which are generated in the three thermal circuits and to achieve optimization in heat utilization efficiency in the whole vehicle and cooling efficiency of the units. For example, it is possible to efficiently perform use of discharged heat which is generated due to cooling of the units for heating the passenger compartment or promotion of cooling of the units using a plurality of thermal circuits.

Layer 2 (L2): The thermal request mediating device 1 mediates thermal requests of the units in each thermal circuit and distributes amounts of heat to the units. By performing mediation of the thermal requests in each thermal circuit in Layer 2 separately from mediation of the thermal requests between the thermal circuits in Layer 1, it is possible to efficiently perform mediation of the thermal requests. Even when constituent units in each thermal circuit change due to a difference in vehicle model, grade, or the like, the change in constituent units does not affect mediation of the thermal requests between the thermal circuits and thus it is not necessary to change the entire mediation function and it is possible to improve versatility of the thermal request mediating device 1.

Layer 3 (L3): A controller such as an ECU that controls the units controls amounts of heat absorbed from a heat medium by the units or amounts of heat discharged to the heat medium. The increase or decrease of an amount of heat absorbed from the heat medium by a unit can be performed, for example, by controlling a flow passage or a flow rate of a high-temperature coolant flowing in the heater core 11, a rotation speed of the fan or an opening level of the grill shutter of the radiator 13 or 24, or a flow rate of a coolant adjusted by the water pump 14 or 25. The increase or decrease of an amount of heat discharged to the heat medium by a unit can be performed, for example, by controlling an output of the electric heater 12, an output of the compressor 31, an opening level of the expansion valve of the evaporator 32, or power consumption from the battery 21 by the PCU 22 and the TA 23. In order to efficiently control amounts of absorbed heat, amounts of discharged heat, and amounts of transferred heat, it is preferable to cooperatively perform control for increasing or decreasing the amounts of absorbed heat and control for increasing or decreasing the amounts of discharged heat in the thermal circuits.

Figure 4:
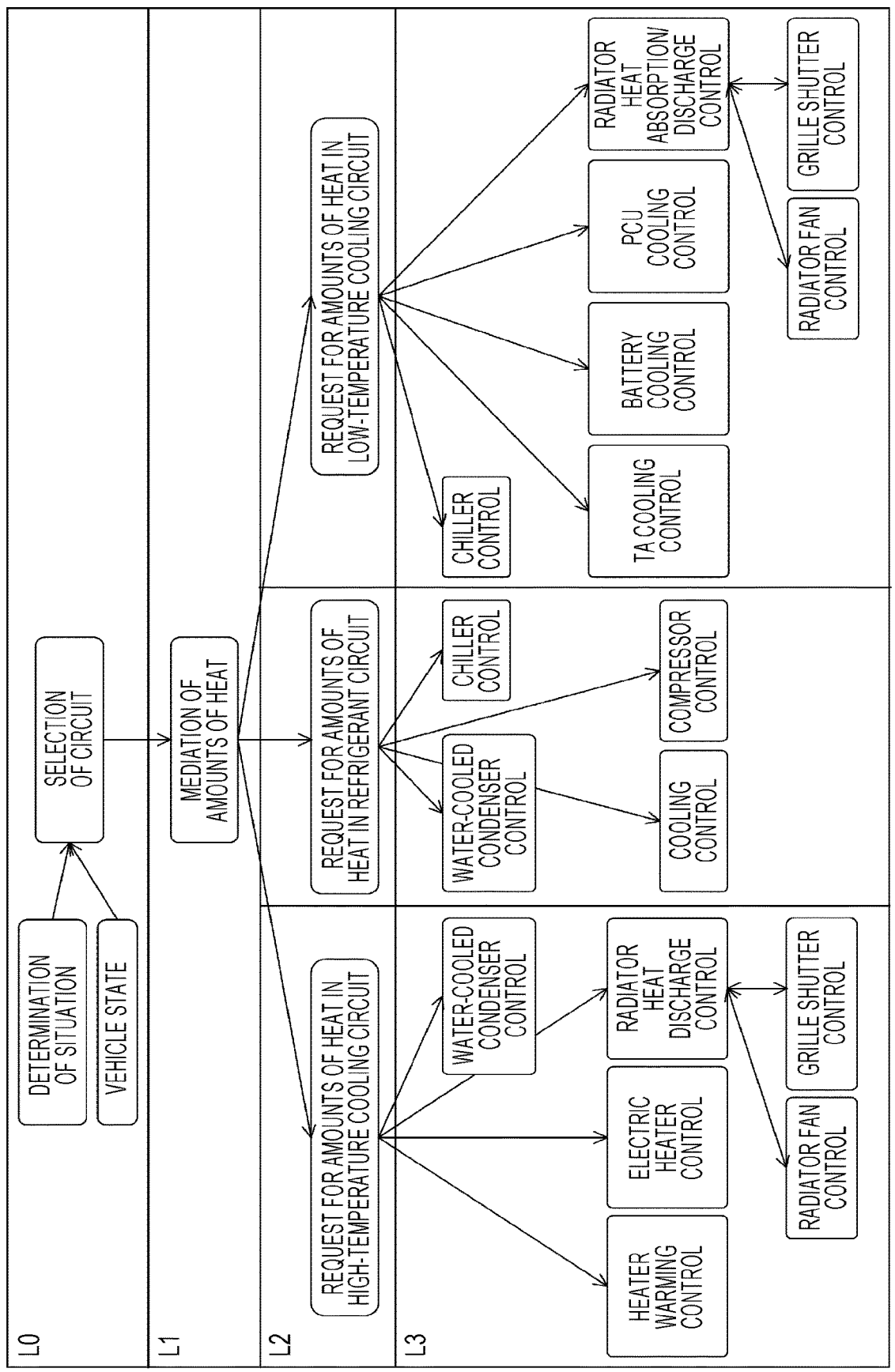
FIG. 4 is a diagram illustrating a hierarchical structure of functions of the thermal request mediating device in a response phase.

In the example illustrated in FIGS. 3 and 4, a control layer of determining situations such as the temperature of a heat medium, the temperature inside or outside the passenger compartment, and vehicle states such as setting of air conditioning and performing selection of a thermal circuit to be used, change of a flow passage in each thermal circuit, or the like based on the result of determination is provided as Layer 0 (L0).

The control layers in the thermal request collection phase and the response phase will be specifically described below in accordance with the sequence of the mediation process.

Thermal Request Collection Phase

L3: In the thermal request collection phase illustrated in FIG. 3, first, the controllers of the units which are included in each thermal circuit and which perform absorption of heat or discharge of heat calculate amounts of absorbed heat or amounts of discharged heat which are requested as control of Layer 3. The controller of each unit calculates an amount of heat absorbed or discharged by the unit as an amount of heat absorbed or discharged per unit time which is required for reaching a target control value (temperature). Since heat mediums in the thermal circuits are different, it is difficult to collect and mediate thermal requests of the thermal circuits using only the temperatures, but it is possible to easily perform collection of thermal requests in Layer 2 and comparison and mediation of the thermal requests between the thermal circuits in Layer 1 by unifying the units of the thermal requests.

L2: Then, as control of Layer 2, the thermal request mediating device 1 acquires requested amounts of heat which are calculated in the control of Layer 3 from the units which request absorption or discharge of heat. The thermal request mediating device 1 collects the acquired amounts of heat requested by the thermal circuits and calculates a total requested amount of heat of the high-temperature cooling circuit HT, a total requested amount of heat of the low-temperature cooling circuit LT, and a total requested amount of heat of the refrigerant circuit RE.

L1: Then, as control of Layer 1, the thermal request mediating device 1 collects the requested amounts of heat of the thermal circuits which are calculated through the control of Layer 2 and ascertains the amounts of absorbed heat or amounts of discharged heat which are requested by the thermal circuits.

Response Phase

L1: In the response phase illustrated in FIG. 4, first, as control of Layer 1, the thermal request mediating device 1 mediates the amounts of heat requested by the thermal circuits which are collected in the thermal request collection phase and allocates amounts of absorbed heat or amounts of discharged heat which are allowable to the thermal circuits. At this time, the thermal request mediating device 1 acquires amounts of heat transferable between the thermal circuits and determines amounts of heat which are allocated to the thermal circuits based on the acquired amounts of transferable heat. The amount of heat transferable from the low-temperature cooling circuit LT to the refrigerant circuit RE via the chiller 41 can be calculated based on a flow rate of a low-temperature coolant which is controlled by the water pump 25 of the low-temperature cooling circuit LT and a temperature difference between the coolant and the refrigerant. The amount of heat transferable from the refrigerant circuit RE to the high-temperature cooling circuit HT can be calculated based on a control value of the compressor 31 included in the refrigerant circuit and a temperature difference between the refrigerant and the high-temperature coolant. When the radiators 13 and 24 are provided like the high-temperature cooling circuit HT and the low-temperature cooling circuit LT illustrated in FIG. 2, the thermal request mediating device 1 can further acquire an amount of heat dischargeable to the outside of the vehicle from one or both of the radiators 13 and 24 and determine the amounts of absorbed heat or amounts of discharged heat which are allocated to the thermal circuits in additional consideration of the acquired amounts of heat dischargeable.

L2: Then, as control of Layer 2, the thermal request mediating device 1 distributes the amounts of absorbed heat or amounts of discharged heat to the plurality of units included in each thermal circuit based on the amounts of absorbed heat or amounts of discharged heat which are allocated to the thermal circuits in the control of Layer 1. Distribution of the amounts of absorbed heat or amounts of discharged heat in the control of Layer 2 can be performed based on a predetermined priority order of the units or a predetermined distribution rule. The thermal request mediating device 1 outputs the distributed amounts of absorbed heat or amounts of discharged heat to the controllers of the units.

L3: Then, as control of Layer 3, the controllers of the units included in each thermal circuit control the units based on the amounts of absorbed heat or amounts of discharged heat which are distributed by the thermal request mediating device 1.

Control Process

Figure 5A:
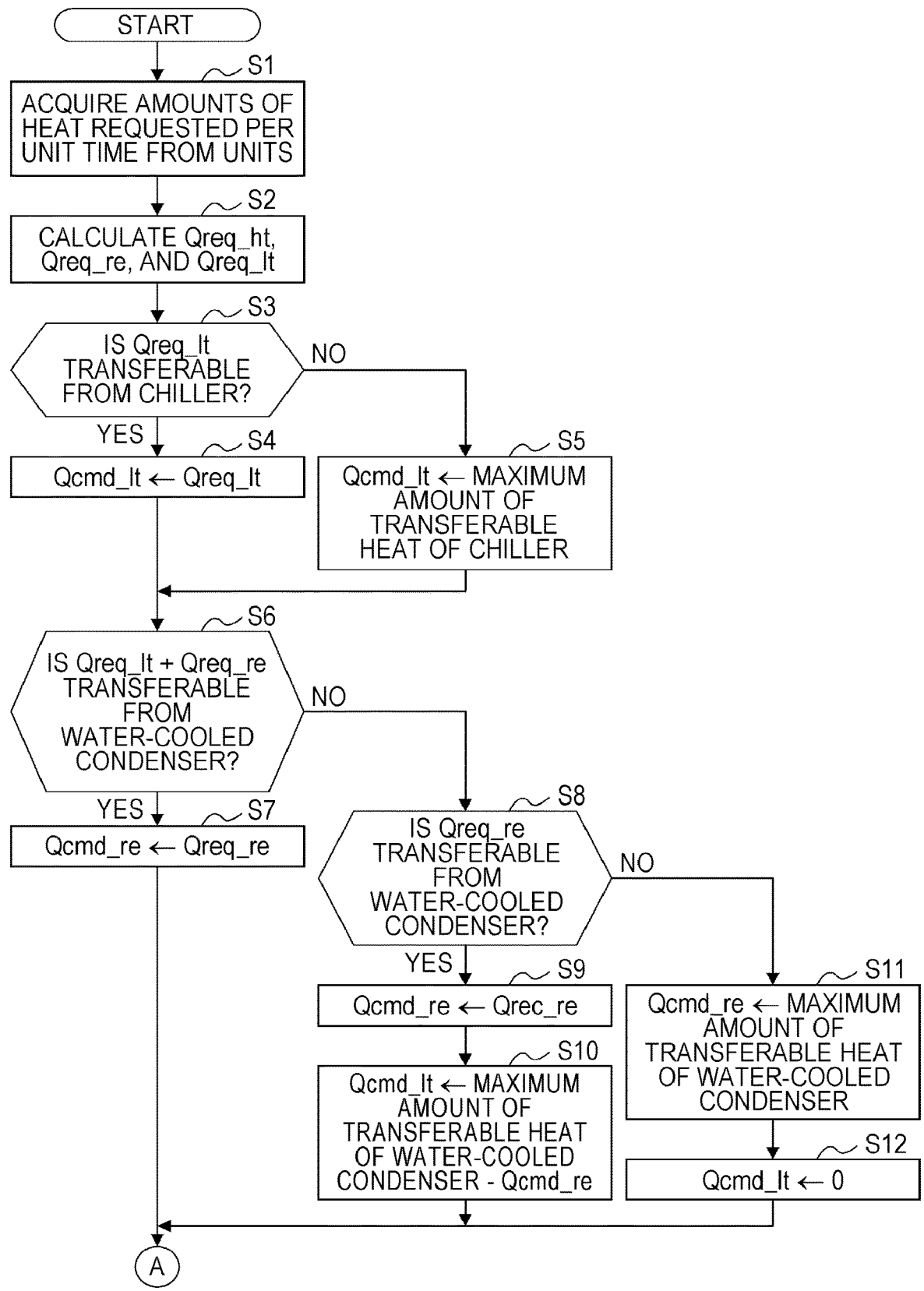
FIG. 5A is a flowchart illustrating a control process which is performed for the thermal request mediating device to mediate thermal requests.
Figure 5B:
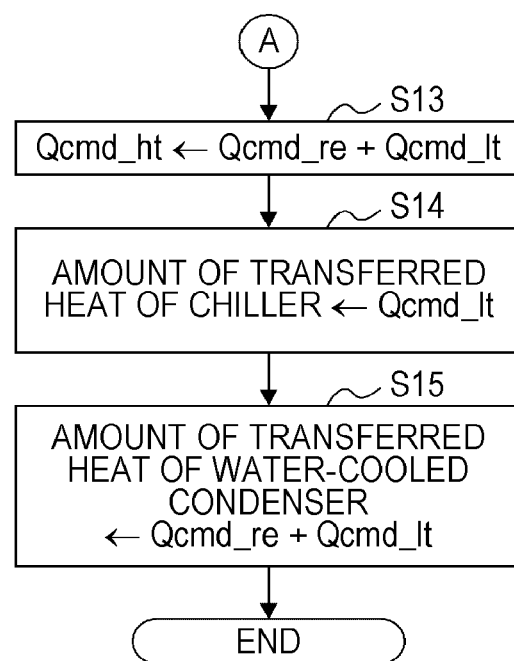
FIG. 5B is a flowchart illustrating a control process which is subsequent to FIG. 5A.

FIGS. 5A and 5B are flowcharts illustrating a control process which is performed for the thermal request mediating device to mediate thermal requests. The control process illustrated in FIGS. 5A and 5B is started with starting of the vehicle and is repeatedly performed at intervals of a predetermined time.

Step S1: The acquisition unit 2 acquires amounts of heat requested by the units included in the high-temperature cooling circuit HT, the low-temperature cooling circuit LT, and the refrigerant circuit RE. An amount of requested heat of each unit is an amount of absorbed heat or an amount of discharged heat which is requested by the unit and can be expressed by a numerical value with inverted signs. When none of absorption and discharge of heat are requested, the amount of requested heat is set to zero. As described above, the units of the amounts of heat can be preferably unified into amounts of thermal energy transferred per unit time in order to easily perform collection, comparison, and mediation of the amounts of requested heat. Here, other units such as a temperature may be used. Thereafter, the control process progresses to Step S2.

Step S2: The calculation unit 3 collects the amounts of requested heat of the units acquired in Step S1 by the acquisition unit 2 for each thermal circuit and calculates a total amount of requested heat $Qreq\_ht$ of the high-temperature cooling circuit HT, a total amount of requested heat $Qreq\_lt$ of the low-temperature cooling circuit LT, and a total amount of requested heat $Qreq\_re$ of the refrigerant circuit RE. By expressing the amounts of requested heat acquired in Step S1 as amounts of thermal energy transferred per unit time, it is possible to easily perform the calculation process of Step S2 by addition and subtraction. Thereafter, the control process progresses to Step S3.

Step S3: The mediation unit 4 determines whether the amount of requested heat $Qreq\_lt$ of the low-temperature cooling circuit LT is transferable to the refrigerant circuit RE via the chiller 41. This determination can be performed based on a maximum amount of transferable heat of the chiller 41 which is calculated using a current temperature difference between the low-temperature coolant and the refrigerant or a current flow rate in the water pump 25. The control process progresses to Step S4 when the determination result of Step S3 is YES, and the control process progresses to Step S5 otherwise.

Step S4: The mediation unit 4 sets the amount of requested heat $Qreq\_lt$ as the amount of allocated heat $Qcmd\_lt$ of the low-temperature cooling circuit LT. Thereafter, the control process progresses to Step S6.

Step S5: The mediation unit 4 sets the maximum amount of transferable heat of the chiller 41 as the amount of allocated heat $Qcmd\_lt$ to the low-temperature cooling circuit LT. Thereafter, the control process progresses to Step S6.

Step S6: The mediation unit 4 determines whether the sum of the amount of requested heat $Qreq\_lt$ of the low-temperature cooling circuit LT and the amount of requested heat $Qreq\_re$ of the refrigerant circuit RE is transferable to the high-temperature cooling circuit HT via the water-cooled condenser 42. The control process progresses to Step S7 when the determination result of Step S6 is YES, and the control process progresses to Step S8 otherwise.

Step S7: The mediation unit 4 sets the amount of requested heat $Qreq\_re$ as the amount of allocated heat $Qcmd\_re$ of the refrigerant circuit RE. Thereafter, the control process progresses to Step S13.

Step S8: The mediation unit 4 determines whether the amount of requested heat $Qreq\_re$ of the refrigerant circuit RE is transferable to the high-temperature cooling circuit HT via the water-cooled condenser 42. This determination can be performed based on a maximum amount of transferable heat of the water-cooled condenser 42 which is calculated using a current temperature difference between the high-temperature coolant and the refrigerant or a current flow rate in the water pump 14. The control process progresses to Step S9 when the determination result of Step S8 is YES, and the control process progresses to Step S11 otherwise.

Step S9: The mediation unit 4 sets the amount of requested heat $Qreq\_re$ as the amount of allocated heat $Qcmd\_re$ of the refrigerant circuit RE. Thereafter, the control process progresses to Step S10.

Step S10: The mediation unit 4 updates the amount of allocated heat $Qcmd\_lt$ of the low-temperature cooling circuit LT to an amount of heat obtained by subtracting the amount of allocated heat $Qcmd\_re$ of the refrigerant circuit RE from the maximum amount of transferable heat of the water-cooled condenser 42. Thereafter, the control process progresses to Step S13.

Step S11: The mediation unit 4 sets the maximum amount of transferable heat of the water-cooled condenser 42 as the amount of allocated heat $Qcmd\_re$ of the refrigerant circuit RE. Thereafter, the control process progresses to Step S12.

Step S12: The mediation unit 4 updates the amount of allocated heat $Qcmd\_lt$ of the low-temperature cooling circuit LT to zero. Thereafter, the control process progresses to Step S13.

Step S13: The mediation unit 4 sets the sum of the amount of allocated heat $Qcmd\_re$ of the refrigerant circuit RE and the amount of allocated heat $Qcmd\_lt$ of the low-temperature cooling circuit LT as the amount of allocated heat $Qcmd\_ht$ of the high-temperature cooling circuit HT. Thereafter, the control process progresses to Step S14.

Step S14: The mediation unit 4 sets the amount of allocated heat $Qcmd\_lt$ of the low-temperature cooling circuit LT as the amount of transferred heat of the chiller 41. Thereafter, the control process progresses to Step S15.

Step S15: The mediation unit 4 sets the sum of the amount of allocated heat $Qcmd\_re$ of the refrigerant circuit RE and the amount of allocated heat $Qcmd\_lt$ of the low-temperature cooling circuit LT as the amount of transferred heat of the water-cooled condenser 42. Thereafter, the control process ends.

Through the control process of Steps S1 to S15 described above, it is possible to mediate the amounts of requested heat of the thermal circuits and to allocate the amounts of absorbed heat or amounts of discharged heat to the thermal circuits.

In the control process, when the determination result of Step S8 is NO, that is, when it is determined that the amount of requested heat $Qreq\_re$ of the refrigerant circuit RE is not transferable to the high-temperature cooling circuit HT via the water-cooled condenser 42, the amount of allocated heat $Qcmd\_re$ of the refrigerant circuit RE is set to be as great as possible and the amount of allocated heat $Qcmd\_lt$ of the low-temperature cooling circuit LT is set to be zero (Steps S11 and S12). Instead of this determination, the maximum amount of transferable heat of the water-cooled condenser 42 may be distributed to the refrigerant circuit RE and the low-temperature cooling circuit LT based on a predetermined distribution rule.

When the radiator 24 is provided in the low-temperature cooling circuit LT as in the configuration illustrated in FIG. 2, it is preferable to consider an amount of heat dischargeable from the radiator 24. Specifically, a step of causing the mediation unit 4 to determine whether the requested amount of discharged heat of the low-temperature cooling circuit LT is able to be discharged from the radiator 24 to the outside is provided before Step S3. In this case, the amount of requested heat $Qreq\_lt$ of the low-temperature cooling circuit LT is defined as an amount of heat transferred to the refrigerant circuit RE (an amount of heat which is not able to be discharged from the radiator 24). When the requested amount of discharged heat of the low-temperature cooling circuit LT can be discharged from the radiator 24 to the outside of the vehicle, the amount of requested heat $Qreq\_lt$ is set to zero. Otherwise, the amount of requested heat $Qreq\_lt$ can be set to an amount of heat obtained by subtracting the amount of heat dischargeable of the radiator 24 from the requested amount of discharged heat of the low-temperature cooling circuit LT.

When the radiator 13 is provided in the high-temperature cooling circuit HT as in the configuration illustrated in FIG. 2, it is preferable to consider an amount of heat dischargeable from the radiator 13. Specifically, when the amount of transferable heat of the water-cooled condenser 42 which is used for the determination of Step S6 is acquired, the mediation unit 4 can determine the amount of transferable heat such that it does not exceed the sum of the amount of absorbed heat which is requested by the high-temperature cooling circuit HT and the amount of heat dischargeable of the radiator 13 based on amount of absorbed heat which is requested by the high-temperature cooling circuit HT and the amount of heat dischargeable of the radiator 13 in addition to the amount of heat transferable from the refrigerant circuit RE to the high-temperature cooling circuit HT by the operation of the compressor 31.

As in a third specific example which will be described later, it is conceivable that the high-temperature cooling circuit HT and the refrigerant circuit RE do not operate (do not circulate a heat medium) at the time of non-operation of air conditioning. It is conceivable that the refrigerant circuit RE does not operate at the time of heating. At the time of non-operating of the refrigerant circuit RE and/or the high-temperature cooling circuit HT, when the requested amount of discharged heat of the low-temperature cooling circuit LT cannot be discharged using only the radiator 24 or when the temperature of the low-temperature coolant is intended to decrease rapidly for cooling of the battery 21 or the like, the amounts of heat may be allocated to the thermal circuits on the assumption that the refrigerant circuit RE and/or the high-temperature cooling circuit HT operates to discharge heat from the low-temperature cooling circuit LT. Specifically, after Step S2 in FIG. 5A, it is determined whether the requested amount of discharged heat by the low-temperature cooling circuit LT is greater than the amount of heat dischargeable of the radiator 24, and the amount of absorbed heat or the amount of discharged heat at the time of operation can be set to the amount of requested heat Qreq_re of the refrigerant circuit RE and/or the amount of requested heat Qreq_ht of the high-temperature cooling circuit HT when the amount of discharged heat requested by the low-temperature cooling circuit LT is greater than the amount of heat dischargeable of the radiator 24 and the refrigerant circuit RE and/or the high-temperature cooling circuit HT does not operate.

Figure 6:
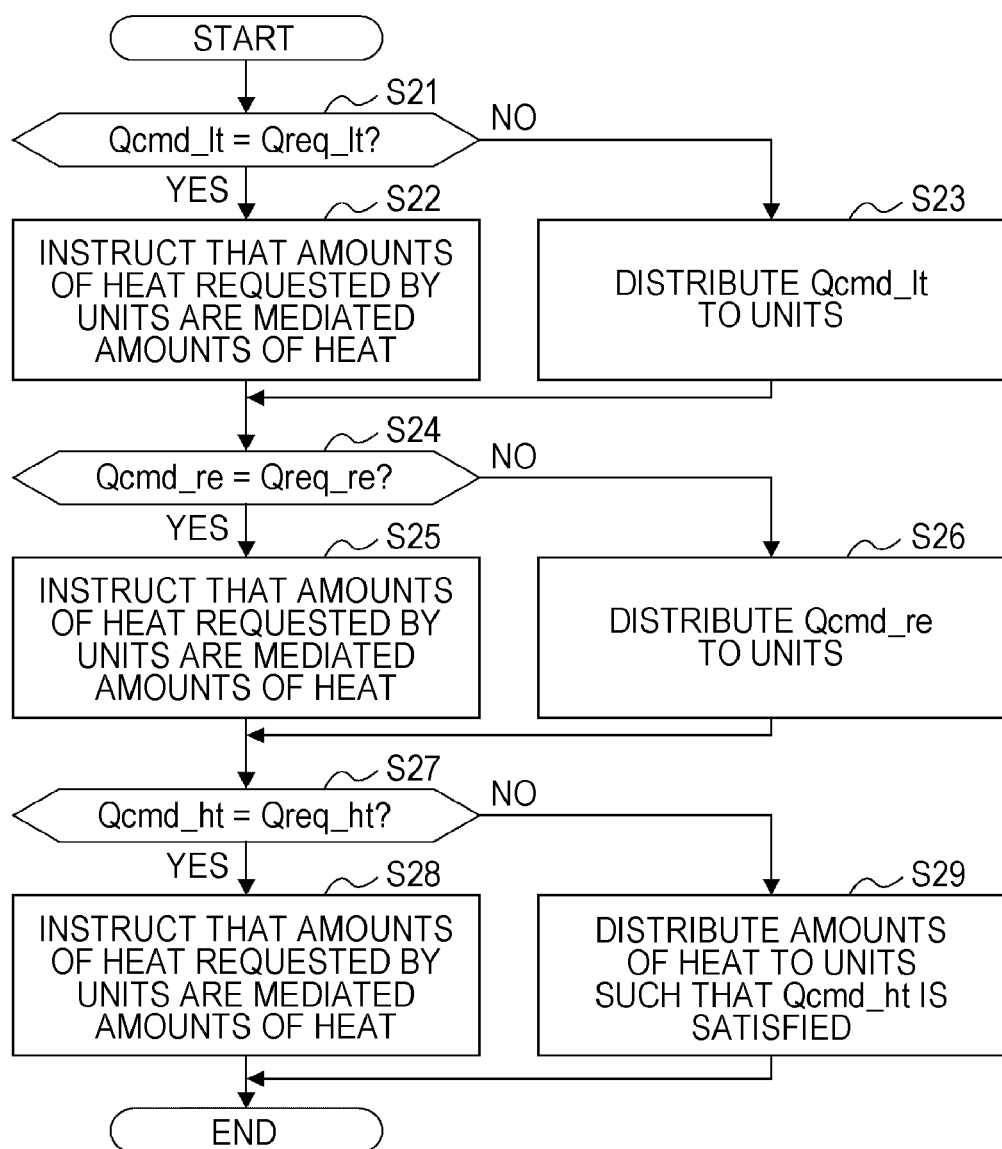
FIG. 6 is a flowchart illustrating a control process which is performed for the thermal request mediating device to distribute amounts of heat to units in each circuit.

FIG. 6 is a flowchart illustrating a control process which is performed for the thermal request mediating device to distribute amounts of heat to the units in each circuit. The control process illustrated in FIG. 6 is performed subsequently to the control process illustrated in FIGS. 5A and 5B.

Step S21: The distribution unit 5 determines whether the amount of allocated heat Qcmd_lt of the low-temperature cooling circuit LT is equal to the amount of requested heat Qreq_lt. The control process progresses to Step S22 when the determination result of Step S21 is YES, and the control process progresses to Step S23 otherwise.

Step S22: The distribution unit 5 distributes the amounts of absorbed heat or amounts of discharged heat which are requested by the units included in the low-temperature cooling circuit LT to the units without any change. Thereafter, the control process progresses to Step S24.

Step S23: The distribution unit 5 distributes the amount of allocated heat Qcmd_lt of the low-temperature cooling circuit LT to the units based on a predetermined distribution rule in the low-temperature cooling circuit LT. The distribution rule can be defined based on a priority level of cooling or heating which is set for each unit in the low-temperature cooling circuit LT. Thereafter, the control process progresses to Step S24.

Step S24: The distribution unit 5 determines whether the amount of allocated heat Qcmd_re of the refrigerant circuit RE is equal to the amount of requested heat Qreq_re. The control process progresses to Step S25 when the determination result of Step S24 is YES, and the control process progresses to Step S26 otherwise.

Step S25: The distribution unit 5 distributes the amounts of discharged heat requested by the units included in the refrigerant circuit RE to the units without any change. Thereafter, the control process progresses to Step S27.

Step S26: The distribution unit 5 distributes the amount of allocated heat Qcmd_re of the refrigerant circuit RE to the units based on a predetermined distribution rule in the refrigerant circuit RE. The distribution rule can be defined based on comfortableness in the passenger compartment. Thereafter, the control process progresses to Step S27.

Step S27: The distribution unit 5 determines whether the amount of allocated heat Qcmd_ht of the high-temperature cooling circuit HT is equal to the amount of requested heat Qreq_ht. The control process progresses to Step S28 when the determination result of Step S27 is YES, and the control process progresses to Step S29 otherwise.

Step S28: The distribution unit 5 distributes the amounts of absorbed heat which are requested by the units included in the high-temperature cooling circuit HT to the units without any change. Thereafter, the control process ends.

Step S29: The distribution unit 5 distributes amounts of heat to the units based on a predetermined distribution rule in the high-temperature cooling circuit HT such that the amount of allocated heat Qcmd_ht of the high-temperature cooling circuit HT is satisfied. Specifically, when the amount of allocated heat Qcmd_ht is less than the amount of absorbed heat which is requested by the high-temperature cooling circuit HT, the shortage of the amount of absorbed heat is distributed to the electric heater 12. When the amounts of discharged heat requested by the low-temperature cooling circuit LT and the refrigerant circuit RE are great and the amount of allocated heat Qcmd_ht is greater than the amount of absorbed heat which is requested by the high-temperature cooling circuit HT, the amount of absorbed heat which is distributed to the electric heater 12 is decreased or the amount of heat discharged from the radiator 13 is increased. Thereafter, the control process ends.

After the control process illustrated in FIG. 6 has ended, the controller of each unit included in each thermal circuit controls the unit to be controlled such that the amount of absorbed heat or the amount of discharged heat of the unit becomes the amount of heat distributed by the distribution unit 5. Specifically, as illustrated in Layer 3 in FIG. 4, the temperature of the heater core 11, the output of the electric heater 12, the rotation speed of the radiator fan and/or the opening level of the grille shutter of the radiator 13, the flow rate in the water pump 14, and the like are controlled such that the amount of absorbed heat or the amount of discharged heat of each unit becomes the amount of heat which is distributed in the high-temperature cooling circuit HT. In the low-temperature cooling circuit LT, the power consumption of the battery 21, the output of the PCU 22, the output of the TA 23, the rotation speed of the radiator fan and/or the opening level of the grille shutter of the radiator 24, the flow rate of the coolant which is adjusted by the water pump 25, and the like are controlled such that the amount of absorbed heat or the amount of discharged heat of each unit becomes the amount of heat which is distributed. In the refrigerant circuit RE, the output of the compressor 31, the opening level of the expansion valve for spraying the refrigerant into the evaporator 32, and the like are controlled such that the amount of absorbed heat or the amount of discharged heat of each unit becomes the amount of heat which is distributed.

First Specific Example

FIGS. 7A to 7E are diagrams illustrating a first specific example of a thermal request mediating process. FIG. 8 is a diagram illustrating an example of a method of calculating amounts of heat requested by the units. In the first specific example, it is assumed that a heat absorption request is issued from the high-temperature cooling circuit HT and heat discharge requests are issued from the low-temperature cooling circuit LT and the refrigerant circuit RE. In FIGS. 7A to 7E, the positive direction of the vertical axis represents an amount of absorbed heat of a unit from a heat medium, and the negative direction of the vertical axis represents an amount of heat discharged to the heat medium. An amount of heat transferred from the low-temperature cooling circuit LT to the refrigerant circuit RE is set as the amount of discharged heat of the chiller 41, and an amount of heat transferred from the refrigerant circuit RE to the high-temperature cooling circuit HT is set as the amount of discharged heat of the water-cooled condenser 42. The method of expressing the amount of absorbed heat and the amount of discharged heat in the drawings is true of FIGS. 9A to 10E which will be described later.

Figure 7A:
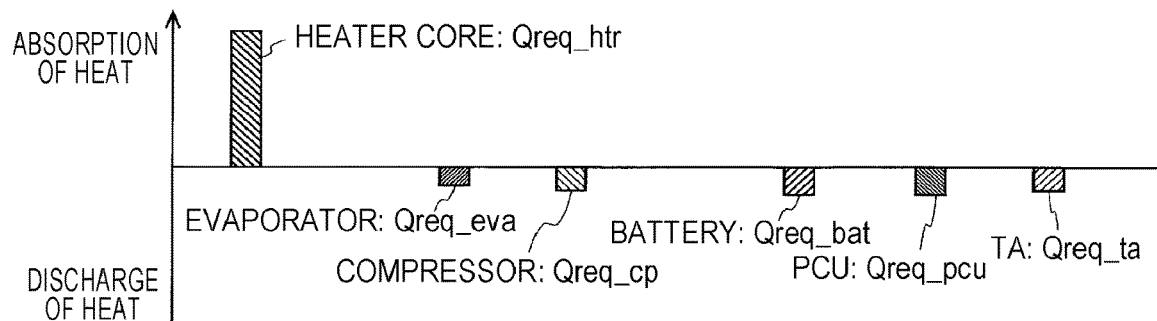
FIG. 7A is a diagram illustrating a first specific example of a thermal request mediating process.
Figure 8:
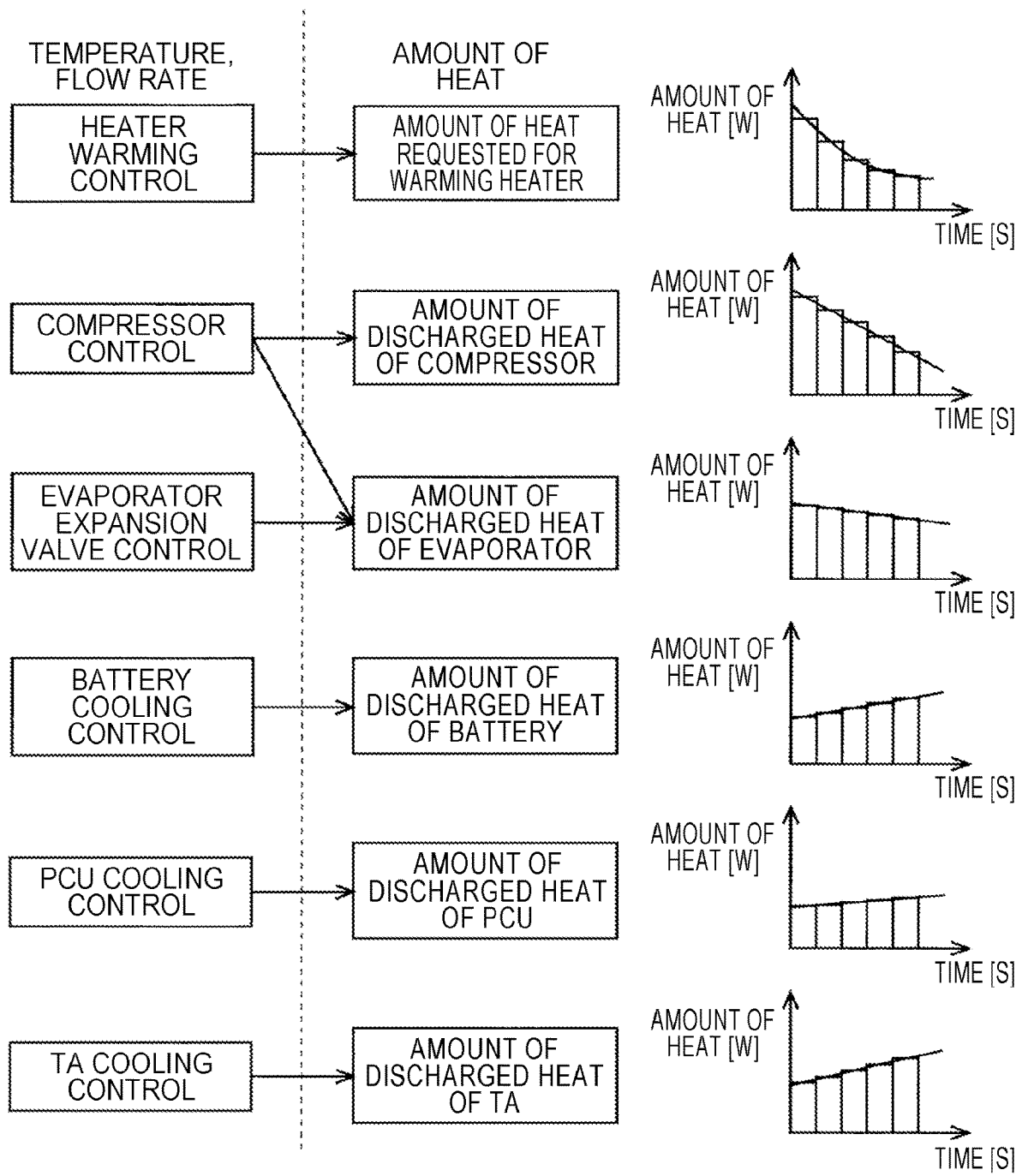
FIG. 8 is a diagram illustrating an example of a method of calculating amounts of heat requested by units.

First, as illustrated in FIG. 7A, the acquisition unit 2 acquires amounts of heat requested by the units included in each thermal circuit (L3 of the thermal request collection phase). The controller of each unit stores map data in which temporal changes of an amount of absorbed heat or an amount of discharged heat required for changing the temperature of the control object (such as an air temperature or a coolant temperature) from a current value to a target control value are mapped in advance as illustrated in FIG. 8, and acquires the necessary amount of absorbed heat or the necessary amount of discharged heat based on the map data. The requested amounts of heat of the heater core 11, the evaporator 32, the compressor 31, the battery 21, the PCU 22, and the TA 23 are referred to as Qreq_htr, Qreq_eva, Qreq_cp, Qreq_bat, Qreq_pcu, and Qreq_ta, respectively.

Figure 7B:
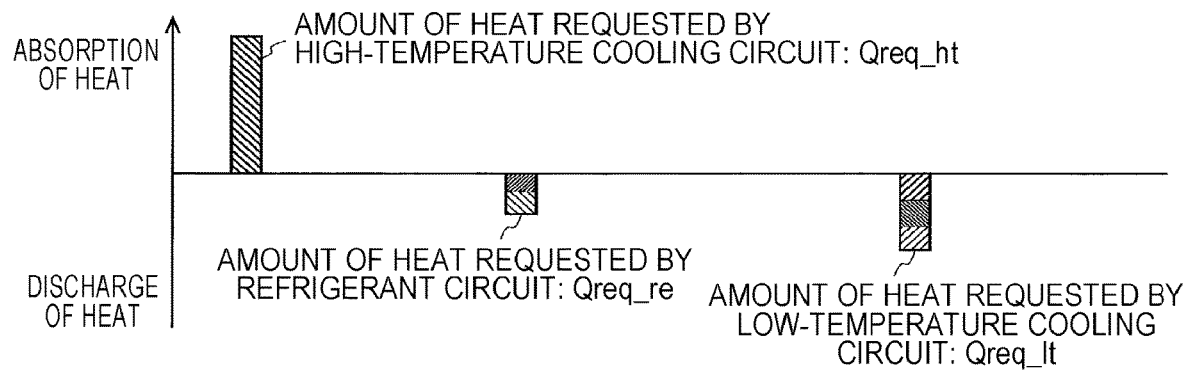
FIG. 7B is a diagram illustrating the first specific example of the thermal request mediating process.

Then, as illustrated in FIG. 7B, the calculation unit 3 collects the amounts of heat requested by the thermal circuits and calculates the requested amount of heat Qreq_ht of the high-temperature cooling circuit HT, the requested amount of heat Qreq_re of the refrigerant circuit RE, and the requested amount of heat Qreq_lt of the low-temperature cooling circuit LT through the following calculation (L2 of the thermal request collection phase). Through the collection process in the calculation unit 3, the mediation unit 4 can refer to the requested amounts of heat of the thermal circuits (L1 of the thermal request collection phase).

Qreq_ht=Qreq_htr

Qreq_re=Qreq_eva+Qreq_cp

Qreq_lt=Qreq_bat+Qreq_pcu+Qreq_ta

Figure 7C:
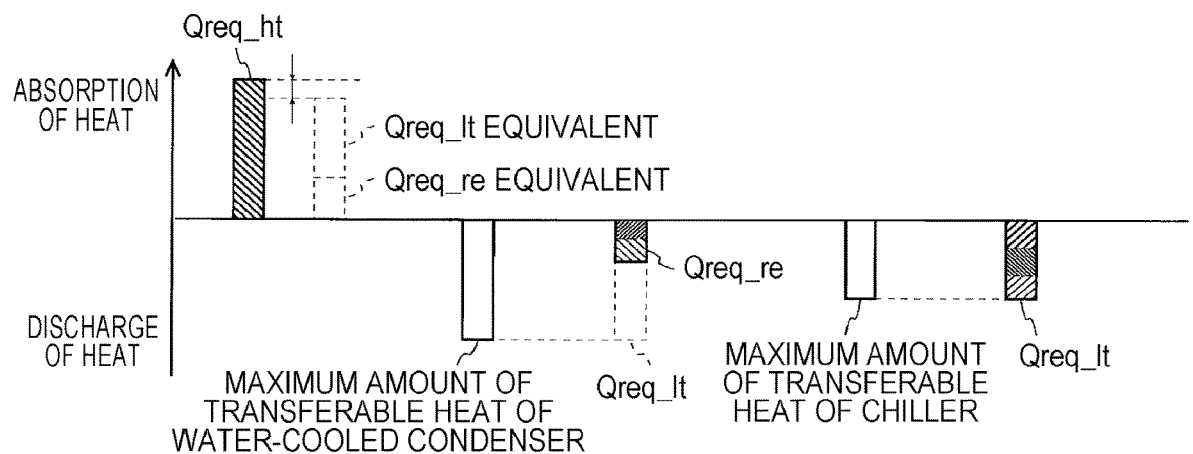
FIG. 7C is a diagram illustrating the first specific example of the thermal request mediating process.

Then, as illustrated in FIG. 7C, the mediation unit 4 mediates the requested amounts of heat based on the requested amounts of heat of the high-temperature cooling circuit HT, the refrigerant circuit RE, and the low-temperature cooling circuit LT which are calculated by the calculation unit 3, the maximum amount of transferable heat of the chiller 41, and the maximum amount of transferable heat of the water-cooled condenser 42 (L1 of the response phase). In the example illustrated in FIG. 7C, the requested amount of heat of the low-temperature cooling circuit LT is equal to or less than the maximum amount of transferable heat of the chiller 41, and the sum of the requested amounts of heat of the refrigerant circuit RE and the low-temperature cooling circuit LT is equal to or less than the maximum amount of transferable heat of the water-cooled condenser 42 and less than the requested amount of heat of the high-temperature cooling circuit HT.

Figure 7D:
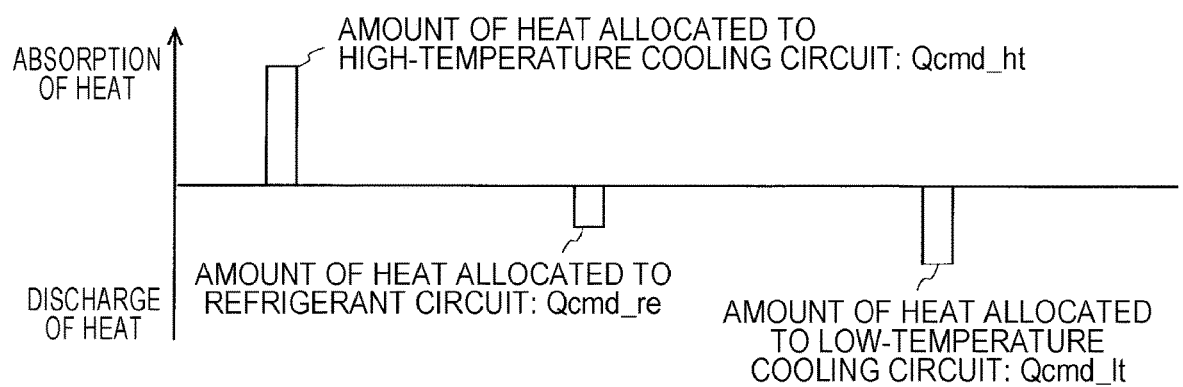
FIG. 7D is a diagram illustrating the first specific example of the thermal request mediating process.

Then, as illustrated in FIG. 7D, the mediation unit 4 allocates an amount of absorbed heat or an amount of discharged heat to each thermal circuit (L2 of the response phase). As illustrated in FIG. 7C, since heat which is discharged from the refrigerant circuit RE and the low-temperature cooling circuit LT is all transferable to the high-temperature cooling circuit HT, the mediation unit 4 sets the amount of allocated heat Qcmd_re of the refrigerant circuit RE and the amount of allocated heat Qcmd_lt of the low-temperature cooling circuit LT to the requested amounts of heat Qreq_re and Qreq_lt. The mediation unit 4 sets the amount of allocated heat Qcmd_ht of the high-temperature cooling circuit HT to the sum of the requested amounts of heat Qreq_re and Qreq_lt.

Figure 7E:
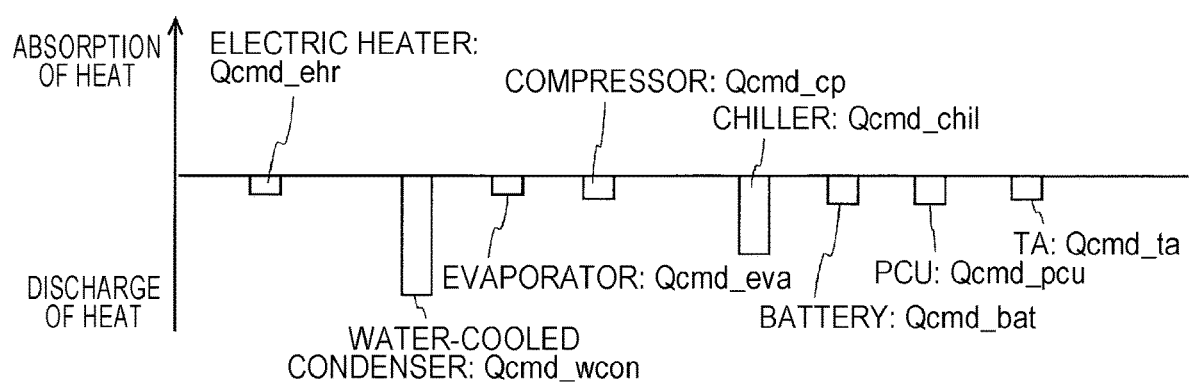
FIG. 7E is a diagram illustrating the first specific example of the thermal request mediating process.

Then, as illustrated in FIG. 7E, the distribution unit 5 distributes the amounts of absorbed heat or amounts of discharged heat which are allocated to the thermal circuits to the units in each thermal circuit (L3 of the response phase). In this example, the distribution unit 5 distributes Qreq_eva, Qreq_cp, Qreq_bat, Qreq_pcu, and Qreq_ta to the evaporator 32, the compressor 31, the battery 21, the PCU 22, and the TA 23, respectively. Since the amount of allocated heat Qcmd_lt of the refrigerant circuit RE and the low-temperature cooling circuit LT is the same as the requested amount of heat, the amounts of absorbed heat or amounts of discharged heat which are distributed to the units are the same as the amounts of absorbed heat or amounts of discharged heat which are requested by the units. As an amount of transferred heat, Qcmd_chil which is equal to the amount of discharged heat which is requested by the low-temperature cooling circuit LT is distributed to the chiller 41. As an amount of transferred heat, Qcmd_wcon which is equal to the sum of the requested amounts of discharged heat of the refrigerant circuit RE and the low-temperature cooling circuit LT is distributed to the water-cooled condenser 42. As illustrated in FIG. 7C, since the sum of the requested amounts of discharged heat of the refrigerant circuit RE and the low-temperature cooling circuit LT is less than the amount of absorbed heat which is requested by the high-temperature cooling circuit HT, all the amounts of discharged heat of the low-temperature cooling circuit LT and the refrigerant circuit RE are transferred to the high-temperature cooling circuit HT via the chiller 41 and the water-cooled condenser 42, and the amount of absorbed heat which is a shortage is distributed to the electric heater 12 for replenishment in order to secure the requested amount of heat of the high-temperature cooling circuit HT.

Second Specific Example

FIGS. 9A to 9E are diagrams illustrating a second specific example of the thermal request mediating process. In the second specific example, it is assumed that the units of the low-temperature cooling circuit LT are cooled using the refrigerant circuit RE at the time of cooling. In this example, it is assumed that cooling of the battery 21 using only the radiator 24 of the low-temperature cooling circuit LT is not sufficient and the amount of discharged heat of the low-temperature cooling circuit LT needs to be discharged to the outside of the vehicle via the refrigerant circuit RE.

Figure 9A:
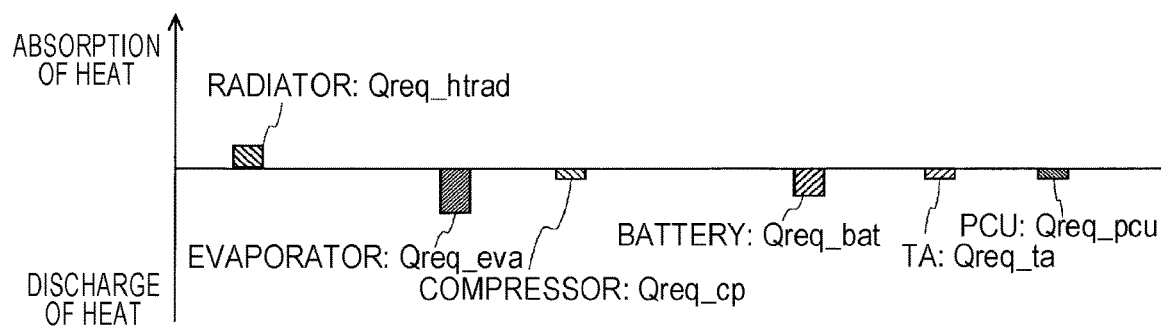
FIG. 9A is a diagram illustrating a second specific example of a thermal request mediating process.

First, as illustrated in FIG. 9A, the acquisition unit 2 acquires amounts of heat requested by the units included in each thermal circuit. The requested amounts of heat of the radiator 13, the evaporator 32, the compressor 31, the battery 21, the TA 23, and the PCU 23 are referred to as Qreq_htrad, Qreq_eva, Qreq_cp, Qreq_bat, Qreq_ta, and Qreq_pcu, respectively.

Figure 9B:
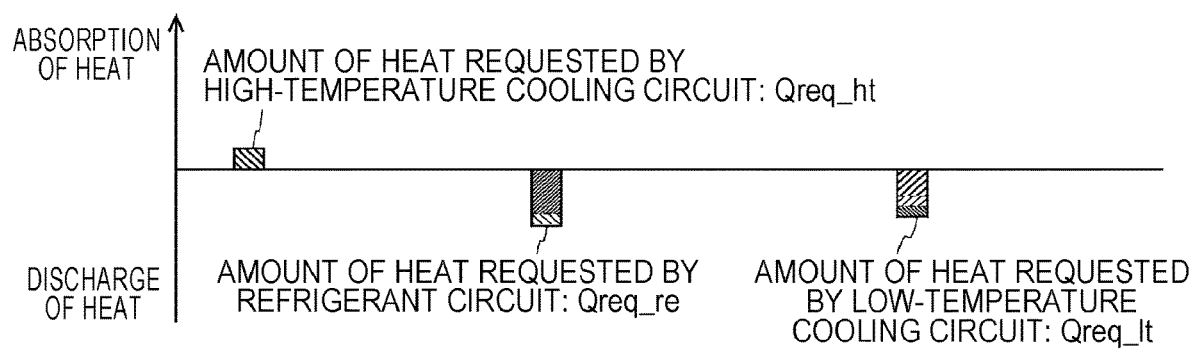
FIG. 9B is a diagram illustrating the second specific example of the thermal request mediating process.

Then, as illustrated in FIG. 9B, the calculation unit 3 collects the requested amounts of heat for each thermal circuit and calculates the requested amount of heat Qreq_ht of the high-temperature cooling circuit HT, the requested amount of heat Qreq_re of the refrigerant circuit RE, and the requested amount of heat Qreq_lt of the low-temperature cooling circuit LT through the following calculation.

Qreq_ht=Qreq_htrad

Qreq_re=Qreq_eva+Qreq_cp

Qreq_lt=Qreq_bat+Qreq_ta+Qreq_pcu

Figure 9C:
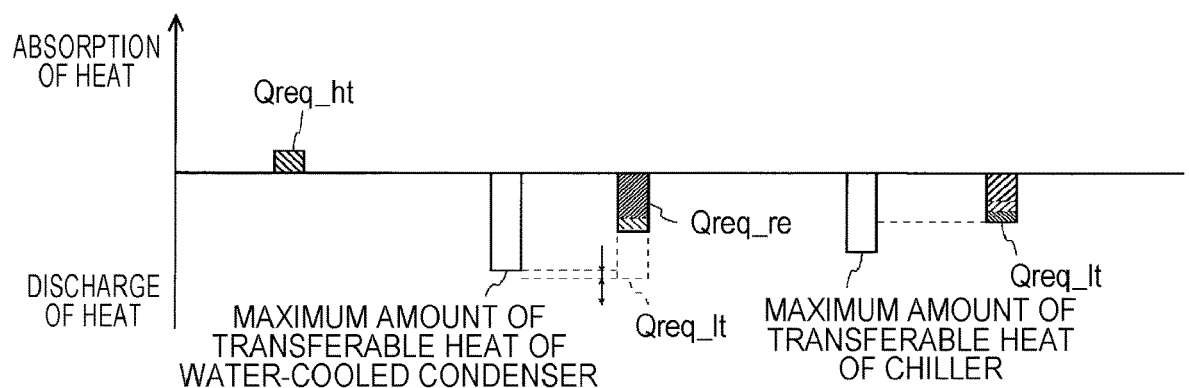
FIG. 9C is a diagram illustrating the second specific example of the thermal request mediating process.

Then, as illustrated in FIG. 9C, the mediation unit 4 mediates the requested amounts of heat based on the requested amounts of heat of the high-temperature cooling circuit HT, the refrigerant circuit RE, and the low-temperature cooling circuit LT which are calculated by the calculation unit 3, the maximum amount of transferable heat of the chiller 41, and the maximum amount of transferable heat of the water-cooled condenser 42. In the example illustrated in FIG. 9C, the requested amount of heat of the low-temperature cooling circuit LT is equal to or less than the maximum amount of transferable heat of the chiller 41, and the sum of the requested amounts of heat of the refrigerant circuit RE and the low-temperature cooling circuit LT is greater than the maximum amount of transferable heat of the water-cooled condenser 42.

Figure 9D:
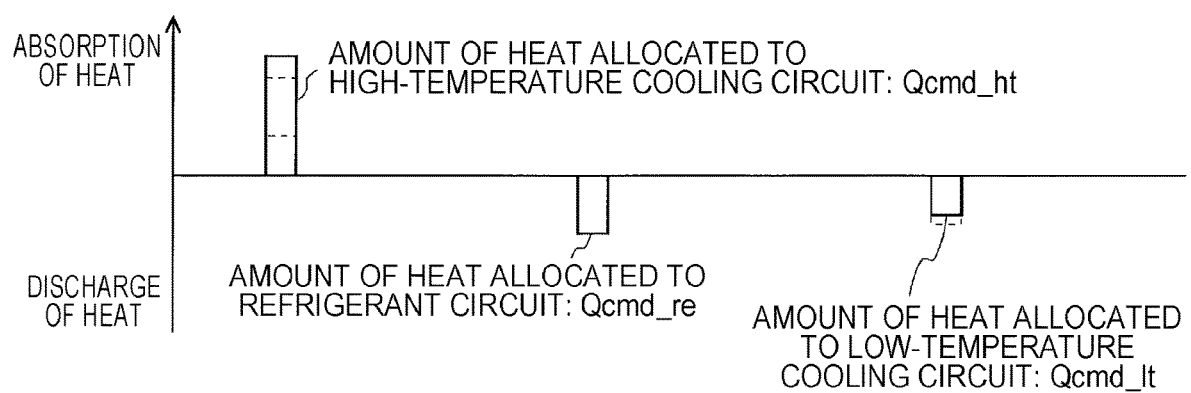
FIG. 9D is a diagram illustrating the second specific example of the thermal request mediating process.

Therefore, as illustrated in FIG. 9D, the mediation unit 4 sets the amount of allocated heat Qcmd_re of the refrigerant circuit RE to the same amount of heat as the requested amount of heat Qreq_re and sets the amount of allocated heat Qcmd_lt of the low-temperature cooling circuit LT to a value obtained by subtracting the amount of allocated heat Qcmd_re of the refrigerant circuit RE from the maximum amount of transferable heat of the water-cooled condenser 42. In this example, the mediation unit 4 preferentially allocates an amount of discharged heat to the refrigerant circuit RE and allocates an amount of discharged heat less than the requested amount of discharged heat to the low-temperature cooling circuit LT. The mediation unit 4 sets the amount of allocated heat Qcmd_ht of the high-temperature cooling circuit HT to the sum of the requested amount of heat of the high-temperature cooling circuit HT and the allocated amounts of heat of the refrigerant circuit RE and the low-temperature cooling circuit LT.

Figure 9E:
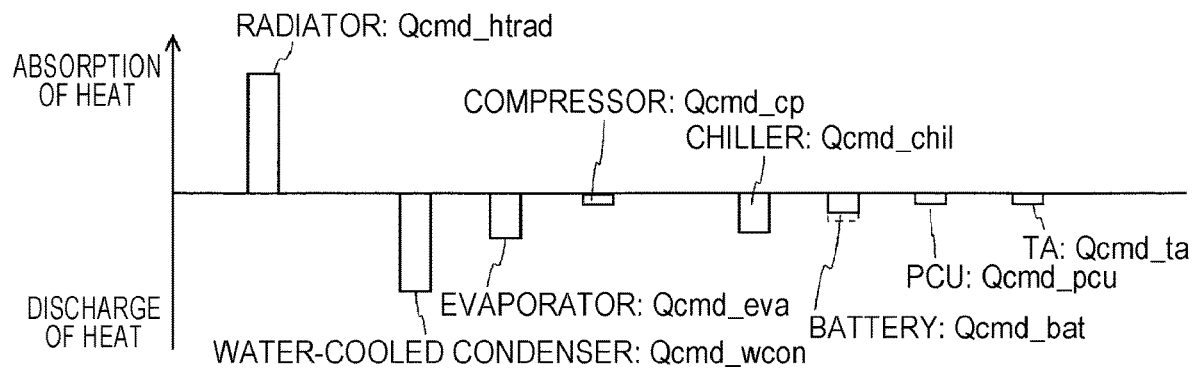
FIG. 9E is a diagram illustrating the second specific example of the thermal request mediating process.

Then, as illustrated in FIG. 9E, the distribution unit 5 distributes an amount of absorbed heat or an amount of discharged heat to the units of each thermal circuit. In this example, since the amount of allocated heat of the refrigerant circuit RE is the same as the requested amount of heat, the distribution unit 5 distributes Qcmd_eva and Qcmd_cp which the same as the requested amounts of discharged heat to the evaporator 32 and the compressor 31. Since the amount of allocated heat Qcmd_lt of the low-temperature cooling circuit LT is less than the requested amount of discharged heat, the distribution unit 5 distributes the amount of allocated heat Qcmd_lt to the units based on a predetermined priority. In the example illustrated in FIG. 9E, priority is given to curbing of deterioration of the battery 21 and Qcmd_bat which is distributed to the battery 21 is decreased less than the requested amount of discharged heat. In this case, for example, by limiting supply of electric power from the battery 21 to the PCU 22, radiation of heat from the battery 21 (the amount of discharged heat) is curbed. Qcmd_chil which is equal to the amount of allocated heat of the low-temperature cooling circuit LT is distributed as an amount of transferred heat to the chiller 41. Qcmd_wcon which is equal to the sum of the amounts of allocated heat of the refrigerant circuit RE and the low-temperature cooling circuit LT is distributed as an amount of transferred heat to the water-cooled condenser 42. The sum of the requested amount of heat Qreq_htrad acquired in FIG. 9B and the amounts of allocated heat of the refrigerant circuit RE and the low-temperature cooling circuit LT is distributed as an amount of discharged heat to the radiator 13 of the high-temperature cooling circuit HT.

Third Specific Example

FIGS. 10A to 10E are diagrams illustrating a third specific example of the thermal request mediating process. In the third specific example, it is assumed that the battery 21 of the low-temperature cooling circuit LT is cooled at the time of non-operation of air conditioning. In this example, it is assumed that cooling of the battery 21 using only the radiator 24 of the low-temperature cooling circuit LT is not sufficient and the amount of discharged heat of the low-temperature cooling circuit LT needs to be discharged to the outside of the vehicle via the refrigerant circuit RE.

Figure 10A:
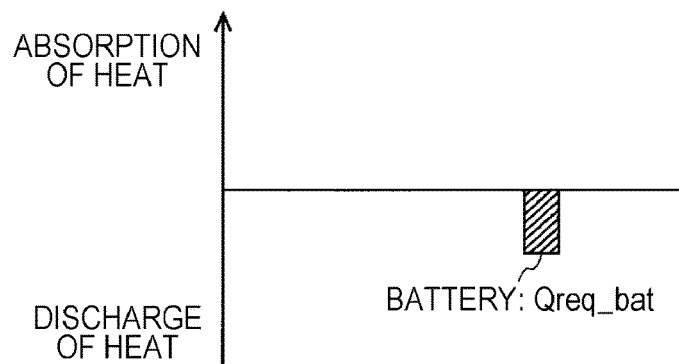
FIG. 10A is a diagram illustrating a third specific example of a thermal request mediating process.

First, as illustrated in FIG. 10A, the acquisition unit 2 acquires amounts of heat requested by the units included in each thermal circuit. In this example, since air conditioning is not used, the requested amounts of heat of the units included in the high-temperature cooling circuit HT and the refrigerant circuit RE are zero and only cooling of the battery 21 is requested. The requested amount of heat of the battery 21 is defined as Qreq_bat.

Figure 10B:
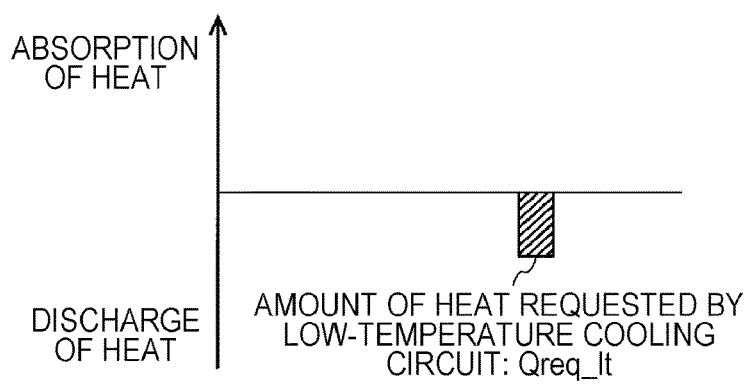
FIG. 10B is a diagram illustrating the third specific example of the thermal request mediating process.

Then, as illustrated in FIG. 10B, the calculation unit 3 collects the requested amounts of heat for each thermal circuit. Since only discharge of heat from the battery 21 is requested, the requested amount of heat Qreq_ht of the high-temperature cooling circuit HT, the requested amount of heat Qreq_re of the refrigerant circuit RE, and the requested amount of heat Qreq_lt of the low-temperature cooling circuit LT are as follows.

Qreq_ht=Qreq_re=0

Qreq_lt=Qreq_bat

Figure 10C:
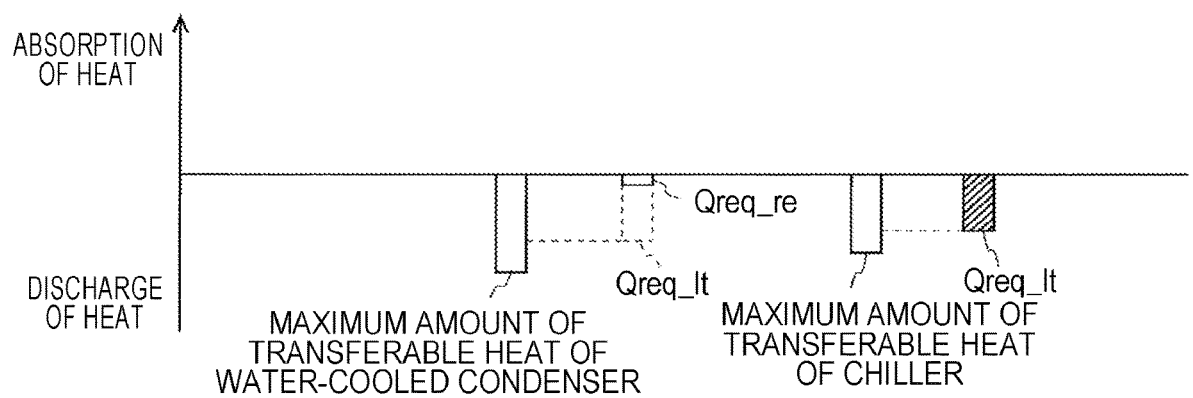
FIG. 10C is a diagram illustrating the third specific example of the thermal request mediating process.

Then, the mediation unit 4 mediates the requested amounts of heat based on the requested amounts of heat of the high-temperature cooling circuit HT, the refrigerant circuit RE, and the low-temperature cooling circuit LT which are calculated by the calculation unit 3, the maximum amount of transferable heat of the chiller 41, and the maximum amount of transferable heat of the water-cooled condenser 42. Since air conditioning is not used in this step, the compressor 31 of the refrigerant circuit RE needs to operate to perform discharge of heat from the low-temperature cooling circuit LT. Therefore, as illustrated in FIG. 10C, the mediation unit 4 presumes that the requested amount of heat Qreq_re is generated with the operation of the compressor 31 of the refrigerant circuit RE, and performs a mediation process. In the following description, for the purpose of convenience of explanation, the requested amount of heat of the refrigerant circuit RE which is set herein is referred to as a "presumptive requested amount of heat." In the example illustrated in FIG. 10C, the requested amount of heat of the low-temperature cooling circuit LT is equal to or less than the maximum amount of transferable heat of the chiller 41, and the sum of the requested amount of heat of the refrigerant circuit RE and the presumptive requested amount of heat Qreq_re of the low-temperature cooling circuit LT is equal to or less than the maximum amount of transferable heat of the water-cooled condenser 42.

Figure 10D:
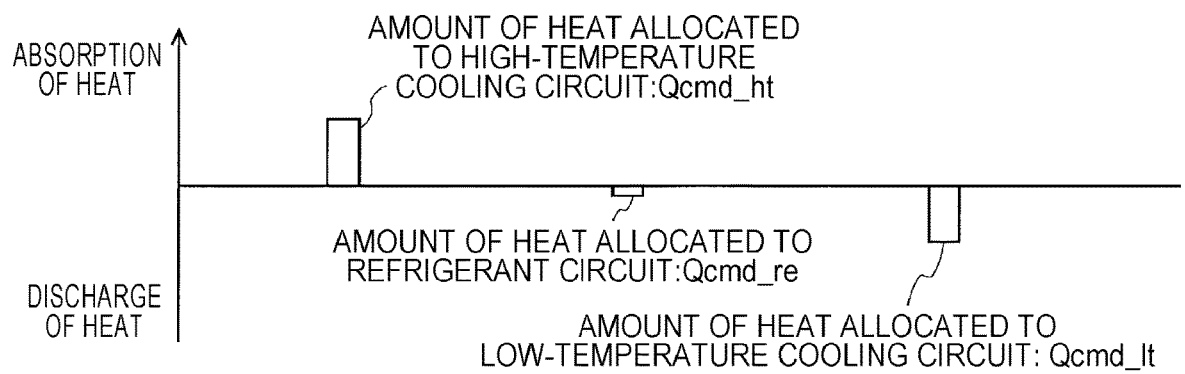
FIG. 10D is a diagram illustrating the third specific example of the thermal request mediating process.

Therefore, as illustrated in FIG. 10D, the mediation unit 4 sets the amount of allocated heat Qcmd_re of the refrigerant circuit RE to the same amount of heat as the presumptive requested amount of heat Qreq_re and sets the amount of allocated heat Qcmd_lt of the low-temperature cooling circuit LT to the same amount of heat as the requested amount of heat Qreq_lt. The mediation unit 4 sets the amount of allocated heat Qcmd_ht of the high-temperature cooling circuit HT to the sum of the amounts of allocated heat of the refrigerant circuit RE and the low-temperature cooling circuit LT.

Figure 10E:
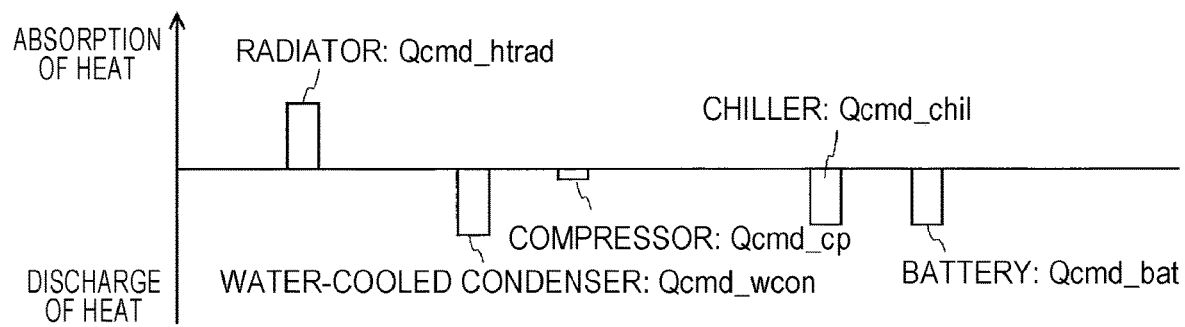
FIG. 10E is a diagram illustrating the third specific example of the thermal request mediating process.

Then, as illustrated in FIG. 10E, the distribution unit 5 distributes the amounts of allocated heat to the units of each thermal circuit. In this example, the distribution unit 5 distributes Qcmd_cp which is equal to the amount of allocated heat Qcmd_re of the refrigerant circuit RE to the compressor 31 for circulating the refrigerant. The distribution unit 5 distributes Qcmd_bat which is equal to the amount of allocated heat Qcmd_lt of the low-temperature cooling circuit LT to the battery 21. The distribution unit 5 distributes Qcmd_chil which is equal to the amount of allocated heat of the low-temperature cooling circuit LT as an amount of transferred heat to the chiller 41. The distribution unit 5 distributes Qcmd_wcon which is equal to the sum of the amounts of allocated heat of the refrigerant circuit RE and the low-temperature cooling circuit LT as an amount of transferred heat to the water-cooled condenser 42. The sum of the amounts of allocated heat of the refrigerant circuit RE and the low-temperature cooling circuit LT is distributed as an amount of discharged heat to the radiator 13 of the high-temperature cooling circuit HT.

The thermal request mediating device 1 can be realized by causing a computer such as an ECU including a processor, a ROM, and/or a RAM to perform the control process illustrated in FIGS. 5A to 6.

Advantages or the Like

As described above, in the thermal request mediating device 1 according to this embodiment, control for thermal requests of a plurality of units is layered, and distribution of an amount of heat in each thermal circuit and mediation of the requested amounts of heat between the thermal circuits (adjustment of the amounts of heat requested by the thermal circuits) are performed in different control layers. Accordingly, the thermal requests of the units do not need to be individually considered at the time of mediation of the requested amounts of heat between the thermal circuits, and the requested amounts of heat between the thermal circuits do not need to be considered at the time of distribution of the amount of heat in each thermal circuit. Accordingly, it is possible to efficiently perform mediation of the thermal requests from a plurality of units mounted in the vehicle and distribution of the amounts of heat to the units. Since the individual thermal requests form the units are not directly referred to at the time of mediation of the requested amounts of heat between the thermal circuits, the thermal request mediating device 1 according to this embodiment can be applied to a case in which the constituent units of the thermal circuits vary depending on a vehicle model, a grade, a configuration of a power train, or the like, and excellent versatility can be achieved.

By unifying an amount of absorbed heat, an amount of discharged heat, an amount of transferable heat, an amount of transferred heat, and an amount of heat dischargeable which are used for the thermal request mediating device 1 to perform a control process into an amount of thermal energy transferred per unit time, it is possible to easily perform collection, mediation, and distribution of the thermal requests.

When the high-temperature cooling circuit HT includes the radiator 13, it is possible to promote discharge of heat from other thermal circuits or to accurately calculate an amount of heat dischargeable from other thermal circuits by further taking consideration of the amount of heat dischargeable of the radiator 13 at the time of mediation of the requested amounts of heat between the thermal circuits.

When the low-temperature cooling circuit LT includes the radiator 23, it is possible to preferentially perform cooling of the units included in the low-temperature cooling circuit LT by further taking consideration of the amount of heat dischargeable of the radiator 24 at the time of mediation of the requested amounts of heat between the thermal circuits.

Other Modified Examples

In the above-mentioned embodiment, the amounts of absorbed heat or the amounts of discharged heat of the units and the thermal circuits are expressed by amounts of thermal energy transferred per unit time (in units of W), but the amounts of absorbed heat or the amounts of discharged heat of the units and the thermal circuits may be expressed by amounts of thermal energy (in units of J) required for a predetermined control time. In this case, an amount of heat transferable between thermal circuits is expressed by an amount of thermal energy transferred per unit time similarly to the requested amounts of heat. When the amounts of absorbed heat or the amounts of discharged heat of the units are expressed by amounts of thermal energy, it is possible to easily perform collection, mediation, and distribution of requested amounts of heat through the control processes which have been described above with reference to FIGS. 5A to 6 and to reduce an influence of a change of the units of each thermal circuit.

The disclosure can be embodied as a thermal request mediating device that mediates a plurality of thermal requests which is issued in a vehicle.

What is claimed is:

1. A thermal request mediating device that is mounted in a vehicle including a plurality of thermal circuits each configured to circulate heat mediums and exchange heat with any one of the other thermal circuits and units configured to perform absorption or discharge of heat via any one of the heat mediums which circulate in the plurality of thermal circuits, the thermal request mediating device comprising:

circuitry configured to:
acquire an amount of heat which is requested by each of a first plurality of the units, the amounts of heat being amounts of absorbed heat or amounts of discharged heat;
calculate an amount of heat which is requested by each of the plurality of thermal circuits based on the acquired amounts of heat which are requested by the first plurality of the units;
determine an amount of heat which is allocated to each of the plurality of thermal circuits based on the calculated amounts of heat which are requested by the plurality of thermal circuits and an amount of heat transferable among the plurality of thermal circuits; and distribute an amount of heat to each of a second plurality of the units based on the determined amounts of heat, wherein the units include at least two of a heater core, an electric heater, a first radiator, a battery, a power control unit, a transaxle, a second radiator, a compressor, an evaporator, a chiller, and a water-cooled condenser.

2. The thermal request mediating device according to claim 1, wherein the amounts of absorbed heat, the amounts of discharged heat, and the amount of heat transferable among the plurality of thermal circuits are expressed as thermal energy transferred per unit time.

3. The thermal request mediating device according to claim 1, wherein a first thermal circuit of the plurality of thermal circuits includes a first radiator that cools a coolant, and the circuitry is configured to determine the amounts of heat which are allocated to the plurality of thermal circuits based on an amount of heat dischargeable from the first radiator.

4. The thermal request mediating device according to claim 3, wherein a second thermal circuit of the plurality of thermal circuits includes a second radiator that cools a coolant, and the circuitry is configured to determine the amounts of heat which are allocated to the plurality of thermal circuits based on an amount of heat dischargeable from the second radiator.

5. The thermal request mediating device according to claim 1, wherein the plurality of thermal circuits includes a second thermal circuit and a third thermal circuit, the second thermal circuit and the third thermal circuit are coupled to each other via a first heat exchanger, and the circuitry is configured to determine an amount of discharged heat which is allocated to the second thermal circuit as an amount of transferred heat that is transferred from the second thermal circuit to the third thermal circuit via the first heat exchanger.

6. The thermal request mediating device according to claim 1, wherein the plurality of thermal circuits includes a first thermal circuit and a third thermal circuit, the first thermal circuit and the third thermal circuit are coupled to each other via a second heat exchanger, and the circuitry is configured to determine a sum of amounts of discharged heat which are allocated to the first thermal circuit and the third thermal circuit as an amount of transferred heat that is transferred from the third thermal circuit to the first thermal circuit via the second heat exchanger.

7. The thermal request mediating device according to claim 1, wherein the circuitry is configured to determine an amount of transferred heat that is transferred among the plurality of thermal circuits based on the determined amounts of heat which are allocated to the plurality of thermal circuits.

8. The thermal request mediating device according to claim 1, wherein the circuitry is configured to distribute an amount of heat for a plurality of the units included in one of the plurality of thermal circuits based on whether an amount of heat which is allocated to the one of the thermal circuits matches an amount of heat requested by the one of the thermal circuits.

9. The thermal request mediating device according to claim 8, wherein the circuitry is configured to distribute the amount of heat for the plurality of the units included in the one of the thermal circuits based on a predetermined distribution rule when the amount of heat which is allocated to the one of the thermal circuits does not match the amount of heat which is requested by the one of the thermal circuits.

10. The thermal request mediating device according to claim 9, wherein the predetermined distribution rule is based on at least one of comfortableness in a passenger compartment or priority levels of cooling or heating which are set for the plurality of the units.

11. The thermal request mediating device according to claim 8, wherein the circuitry is configured to distribute the amount of heat for the plurality of the units included in the one of the thermal circuits based on the amount of heat which is requested by the one of the thermal circuits when the amount of heat which is allocated the one of the thermal circuits matches the amount of heat which is requested by the one of the thermal circuits.

12. The thermal request mediating device according to claim 1, wherein the first plurality of the units and the second plurality of the units are the same plurality of units.

13. A vehicle comprising:

a plurality of thermal circuits each configured to circulate heat mediums and exchange heat with any one of the other thermal circuits;

units configured to perform absorption or discharge of heat via any one of the heat mediums which circulate in the plurality of thermal circuits, the units including at least two of a heater core, an electric heater, a first radiator, a battery, a power control unit, a transaxle, a second radiator, a compressor, an evaporator, a chiller, and a water-cooled condenser; and circuitry configured to:

acquire an amount of heat which is requested by each of a first plurality of the units, the amounts of heat being amounts of absorbed heat or amounts of discharged heat, calculate an amount of heat which is requested by each of the plurality of thermal circuits based on the acquired amounts of heat which are requested by the first plurality of the units, determine an amount of heat which is allocated to each of the plurality of thermal circuits based on the calculated amounts of heat which are requested by the plurality of thermal circuits and an amount of heat transferable among the plurality of thermal circuits, and distribute an amount of heat to each of a second plurality of the units based on the determined amounts of heat.

14. The vehicle according to claim 13, wherein the first plurality of the units and the second plurality of the units are the same plurality of units.

15. A method comprising:

acquiring an amount of heat which is requested by each of a first plurality of units configured to perform absorption or discharge of heat via any one of heat mediums which circulate in a plurality of thermal circuits each configured to circulate the heat mediums and exchange heat with any one of the other thermal circuits, the amounts of heat being amounts of absorbed heat or amounts of discharged heat and the units including at least two of a heater core, an electric heater, a first radiator, a battery, a power control unit, a transaxle, a second radiator, a compressor, an evaporator, a chiller, and a water-cooled condenser, calculating an amount of heat which is requested by each of the plurality of thermal circuits based on the acquired amounts of heat which are requested by the first plurality of the units, determining an amount of heat which is allocated to each of the plurality of thermal circuits based on the calculated amounts of heat which are requested by the plurality of thermal circuits and an amount of heat transferable among the plurality of thermal circuits, and distributing an amount of heat to each of a second plurality of the units based on the determined amounts of heat.

16. The method according to claim 15, wherein the first plurality of the units and the second plurality of the units are the same plurality of units.

* * * * *